United States Patent [19]
Inokuchi et al.

[11] Patent Number: 6,138,203
[45] Date of Patent: Oct. 24, 2000

[54] INFORMATION PROCESSING APPARATUS AND METHOD ENABLING A WRITE-ONCE RECORDING MEDIUM TO BE UTILIZED AS A REWRITEABLE RECORDING MEDIUM

[75] Inventors: Tatsuya Inokuchi; Osamu Udagawa; Yasuyoshi Kaneko, all of Kanagawa, Japan

[73] Assignee: Sony Corporation, Tokyo, Japan

[21] Appl. No.: 08/860,614

[22] PCT Filed: Oct. 31, 1996

[86] PCT No.: PCT/JP96/03194

§ 371 Date: Sep. 23, 1997

§ 102(e) Date: Sep. 23, 1997

[87] PCT Pub. No.: WO97/17652

PCT Pub. Date: May 15, 1997

[30] Foreign Application Priority Data

Nov. 10, 1995 [JP] Japan .................................. 7-317417

[51] Int. Cl.[7] ..................................... G06F 12/00
[52] U.S. Cl. ...................... 711/103; 711/207; 365/185.11
[58] Field of Search ..................... 711/207, 111, 711/112, 103; 365/185.11

[56] References Cited

U.S. PATENT DOCUMENTS

| | | | |
|---|---|---|---|
| 4,887,165 | 12/1989 | Sato et al. ............................. | 358/474 |
| 5,029,125 | 7/1991 | Sciupac ................................. | 707/205 |
| 5,488,359 | 1/1996 | Faris et al. .......................... | 340/825.44 |
| 5,544,119 | 8/1996 | Wells et al. ......................... | 365/185.11 |
| 5,740,349 | 4/1998 | Hasbun et al. ..................... | 395/182.06 |
| 5,822,614 | 10/1998 | Kenton et al. ........................ | 395/828 |

FOREIGN PATENT DOCUMENTS

| | | | |
|---|---|---|---|
| 2-194455 | 8/1990 | Japan | G06F 12/16 |
| 2-214924 | 8/1990 | Japan | G06F 3/06 |
| 6-87229 | 11/1994 | Japan | G06F 12/00 |

OTHER PUBLICATIONS

Worm Disk Drive System (Storey, P.A.), IEEE publication, 1990.

*Primary Examiner*—John W. Cabeca
*Assistant Examiner*—Nasser Moazzami

[57] ABSTRACT

An information processing apparatus and information processing method enables a write once type disc to be used as a rewritable recording medium. There can be realized an address control mechanism wherein even if the physical recording position is changed, the logical address of the same block is not changed by controlling the physical recording position on the recording medium on an imaginary address space in correspondence to the logical address. Thus the write once type recording medium can be realized as a rewritable recording medium. In addition, by monitoring the writable residual capacity, the recording medium can record data which is made or being updated in the memory.

6 Claims, 19 Drawing Sheets

| Sequence Number | | LBA |
|---|---|---|
| 123456789abcdef0h | → | 1000h |
| 123456789abcdef1h | → | 1001h |
| 123456789abcdef2h | → | 1002h |
| 123456789abcdef3h | → | 1003h |
| 123456789abcdef4h | → | 1004h |

FIG. 6

| number of entry | 6 |
|---|---|
| free | 2 |
| table[0] | 30 |
| table[1] | 6 |
| table[2] | 4 |
| table[3] | 4 |
| table[4] | 1 |
| table[5] | 22 |

FIG. 7

| Leaf Node | $1 \times 2^{20}$ kbyte /2 kbyte /(145 extent/2)<br>= 7231.6 block = 7232 block |
|---|---|
| Index Node (3rd level) | 72312 block / (170 index/2) = 850.7 block<br>= 851 block |
| Index Node (2nd level) | 851 block / (170 index/2) = 10.01 block<br>= 11 block |
| Index Node (root) | 1 block |
| total | 8095 block |

FIG. 8

| Sequence Key | LBA | Length |
|---|---|---|
| 0 | 3 | 10 |

| Sequence Key | LBA | Length |
|---|---|---|
| 0 | 3 | 3 |
| 7 | 10 | 3 |

(A)

(B)

(C)

(D)

| Start | Length | contents |
|---|---|---|
| 1152 | 5 | File System Standard ID (= "CDRFS") |
| 1157 | 1 | File System Version |
| 1158 | 16 | Copyright (= "Sxxx CORPORATION") |
| 1174 | 1 | Super Block Search Method |
| 1175 | 1 | Reserved (= 0) |
| 1176 | 4 | Super Block LBA |
| 1180 | 4 | Start LBA of Super Block Area |
| 1184 | 4 | End LBA of Super Block Area |
| 1188 | 2 | File System Flags |
| 1190 | 2 | Packet Size (Addressing Method-II only) |
| 1192 | 4 | Volume Capacity |
| 1196 | 852 | Reserved (= 0) |

FIG. 12

| Start | Length | contents |
|---|---|---|
| 0 | 64 | Super Block Header |
| 64 | 2 | Super Block Version |
| 66 | 2 | Super Block Flags |
| 68 | 4 | Node Table LBA |
| 72 | 4 | Previous Super Block LBA |
| 76 | 4 | Sequence B*Tree Root Node Number |
| 80 | 4 | Directory B*Tree Root Node Number |
| 84 | 4 | Serial Number |
| 88 | 400 | Super Block List |
| 488 | 1536 | Super Block Tag List |
| 2024 | 20 | Reserved (= 0) |
| 2044 | 4 | Check Sum |

FIG. 13

| Start | Length | contents |
|---|---|---|
| 0 | 4 | Super Block LBA |
| 4 | 4 | Creation Time |

FIG. 14

| Start | Length | contents |
|---|---|---|
| 0 | 4 | Super Block LBA |
| 4 | 4 | Creation Time |
| 8 | 56 | Tag String |

FIG. 15

| Start | Length | contents |
|---|---|---|
| 0 | 4 | Number of Entry (= Ne) |
| 4 | 4 | Free Entry |
| 8 | 4 | entry[0] |
| 12 | 4 | entry[1] |
| 16 | 4 | entry[2] |
| ⋮ | ⋮ | ⋮ |
| 4Ne+8 | 4 | entry[Ne-1] |

FIG. 16

| Start | Length | contents |
|---|---|---|
| 0 | 4 | Node Number |
| 4 | 1 | Number of records |
| 5 | 3 | reserve (0) |
| 8 | 12 | Index Record[0] |
| 20 | 12 | Index Record[1] |
| ⋮ | ⋮ | ⋮ |
| 2036 | 12 | Index Record[169] |

FIG. 17

| Start | Length | contents |
|---|---|---|
| 0 | 8 | Key |
| 8 | 4 | Node Number |

FIG. 18

| Start | Length | contents |
|---|---|---|
| 0 | 4 | Node Number |
| 4 | 1 | Number of records |
| 5 | 3 | reserved (= 0) |
| 8 | 4 | Previous Node Number |
| 12 | 4 | Next Node Number |
| 16 | 2 | reserved (= 0) |
| 18 | 14 | Extent Record[0] |
| 32 | 14 | Extent Record[1] |
| ⋮ | ⋮ | ⋮ |
| 2034 | 14 | Extent Record[144] |

FIG. 19

| Start | Length | contents |
|---|---|---|
| 0 | 8 | Key |
| 8 | 4 | LBA |
| 12 | 2 | Length |

FIG. 20

| Start | Length | contents |
|---|---|---|
| 0 | 4 | Node Number |
| 4 | 1 | Number of records |
| 5 | 1 | reserve (0) |
| 6 | 2 | Total Size of Records |
| 8 | 4 | Previous Node Number |
| 12 | 4 | Next Node Number |
| 16 | 2 | End of Free Area |
| 18 | 2030 | Directory Record Area |

PosX:Directory Record Offset
RecX:Directory Record
Free:Free Area

| Start | Length | contents |
|---|---|---|
| 0 | 8 | Key |
| 8 | 2 | Size |
| 10 | 1 | Type |
| 11 | 1 | Attribute |
| 12 | 2 | Mode |
| 14 | Size - 14 | Other Attribute |

| Start | Length | contents |
|---|---|---|
| 0 | 4 | Directory Number |
| 4 | 2 | Hashed Key |
| 6 | 2 | Sequencial Number |

FIG. 24

| Type | contents |
|---|---|
| Type = 0 | File |
| Type = 1 | Directory |
| Type = 2 | Volume Label (Root Directory) |
| Type = 3 | Symbolic Linc |
| Type = 4 | Hard Linc |

FIG. 25

| Start | Length | contents |
|---|---|---|
| 0 | 8 | Key |
| 8 | 2 | Size |
| 10 | 1 | Type |
| 11 | 1 | Attribute |
| 12 | 2 | Mode |
| 14 | 2 | Number of Links |
| 16 | 2 | User Name |
| 18 | 2 | Group Name |
| 20 | 4 | Last Access Time |
| 24 | 4 | Last Modification Time |
| 28 | 4 | Creation Time |
| 32 | 8 | File Size |
| 40 | 4 | Sequence Number |
| 44 | 1 | Name Length (=NL) |
| 45 | NL | File Name |

FIG. 26

| Start | Length | contents |
|---|---|---|
| 0 | 8 | Key |
| 8 | 2 | Size |
| 10 | 1 | Type |
| 11 | 1 | Attribute |
| 12 | 2 | Mode |
| 14 | 2 | Number of Links |
| 16 | 2 | User Name |
| 18 | 2 | Group Name |
| 20 | 4 | Last Access Time |
| 24 | 4 | Last Modification Time |
| 28 | 4 | Creation Time |
| 32 | 4 | DirectoryID |
| 36 | 1 | Name Length (=NL) |
| 37 | NL | Directory Name |

FIG. 27

| Start | Length | contents |
|---|---|---|
| 0 | 8 | Key |
| 8 | 2 | Size |
| 10 | 1 | Type |
| 11 | 1 | Reserve (=0) |
| 12 | 8 | Link |
| 20 | 1 | Name Length (=NL) |
| 21 | NL | Link Name |

INFORMATION PROCESSING APPARATUS AND METHOD ENABLING A WRITE-ONCE RECORDING MEDIUM TO BE UTILIZED AS A REWRITEABLE RECORDING MEDIUM

TECHNICAL FIELD

The present invention relates to an information processor and a method of information processing, and more particularly to an information processor and a method of information processing wherein information is recorded on, for example, a write-once type disc-like recording medium.

BACKGROUND ART

Conventionally, as a large volume data recording medium, a read only medium which is called a CD-ROM (Compact Disc-Read Only Memory) is available. There is available a write-once type disc-like recording medium called Compact Disc-Recordable (CD-R) in which data can be recorded only once by forming a recording layer on the CD-ROM.

This CD-R can be played back by using a conventional CD-ROM drive so that all the data is recorded and prepared, for example, on a hard disc with the result that the CD-R in which writing is completed can be used as a CD (Compact Disc) by writing all the data in the CD-R.

By the way, since the CD-R having such a constitution can be written only once, it is difficult to rewrite the data in an area where data is written once in the same area so that it is difficult to use the CD-R as a rewritable recording medium like a so-called floppy disc.

In the case where recorded data is renewed with a write once disc type CD-R disc, it is difficult to rewrite an area which has been once written. Consequently, work is required to rewrite the renewed data on a new area in this case. Due to such characteristics of the write once type recording medium, in the case where an attempt is made to rewrite data by using the write once type CD-R disc, the usable residual capacity of the CD-R disc will be decreased with the result that there arises a problem in that it becomes difficult to write the data which is about to be renewed on the memory once there is no room for the usable capacity.

The present invention has been made in view of the aforementioned problem, and the invention provides an information processor and a method of information processing wherein the write once type recording medium can be used as if the recording medium was a rewritable type recording medium and the usable residual capacity can be monitored.

DISCLOSURE OF THE INVENTION

The present invention comprises control means for allowing a physical position which is recorded on a medium to correspond to a logical position, generating a correspondence table between the logical position and the physical position thereby controlling, upon the physical position being changed, the correspondence relation between the logical position and the physical position after the change, recording means for recording the file data in the memory and the element data of the correspondence table as written data, calculating means for calculating a writable residual capacity of the medium, comparing means for comparing written data amount in the memory with the writable residual capacity, and outputting means or outputting the result of the detected surplus as the surplus detection result when the surplus is detected.

Furthermore, the invention allows the control means to immediately record the written data in the memory on the medium when the surplus detection result is output.

Furthermore, the information processor of the invention provides warning means for displaying a warning to a predetermined display means when the surplus detection result is output.

Furthermore, the invention comprises the steps of: allowing a physical position which is recorded on a medium to correspond to a logical position, generating a correspondence table between the logical position and the physical position thereby controlling, upon the physical position being changed, the correspondence relation between the logical position and the physical position after the change; recording the file data in the memory and the element data of the correspondence table as written data; calculating a writable residual capacity of the medium, comparing written data amount in the memory with the writable residual capacity, and outputting the result of the detected surplus as the surplus detection result when the surplus is detected.

In accordance with the invention, an address control mechanism can be realized which does not change the logical address in the same block even when the physical recording position is changed by controlling the physical recording position on the medium on the imaginary address space in the memory. Thus the write once type recording medium can be treated as if the medium is a rewritable recording medium.

In other words, the data being prepared and renewed can be recorded on the recording medium with certitude by monitoring the usable residual capacity of a write once type recording medium.

BRIEF DESCRIPTION OF THE DRAWINGS

FIG. 6 is a schematic view showing a correspondence table by means of an extent.

FIG. 7 is a schematic view showing a node table.

FIG. 8 is a schematic view dedicated for the explanation of a maximum number of the block number.

FIG. 12 is a schematic view showing an FVD structure.

FIG. 13 is a schematic view showing a structure of a super bloc.

FIG. 14 is a schematic view showing a structure of a super block list entry.

FIG. 15 is a schematic view showing a structure of a dug entry.

FIG. 16 is a schematic view showing a structure of a node table.

FIG. 17 is a schematic view showing a B star-tree index node.

FIG. 18 is a schematic view showing a structure of an index record.

FIG. 19 is a schematic view showing a structure of a sequence B star-tree leaf node.

FIG. 20 is schematic view showing a structure of an extent record.

FIG. 24 is a schematic view showing a structure of a directory record.

FIG. 25 is a schematic view dedicated for the illustration of the kind of type.

FIG. 26 is a schematic view showing a structure of a file directory code.

FIG. 27 is a schematic view showing a structure of a directory record.

FIG. 28 is a schematic view showing a structure of a link directory record.

BEST MODE FOR EMBODYING THE INVENTION

Figure 1:
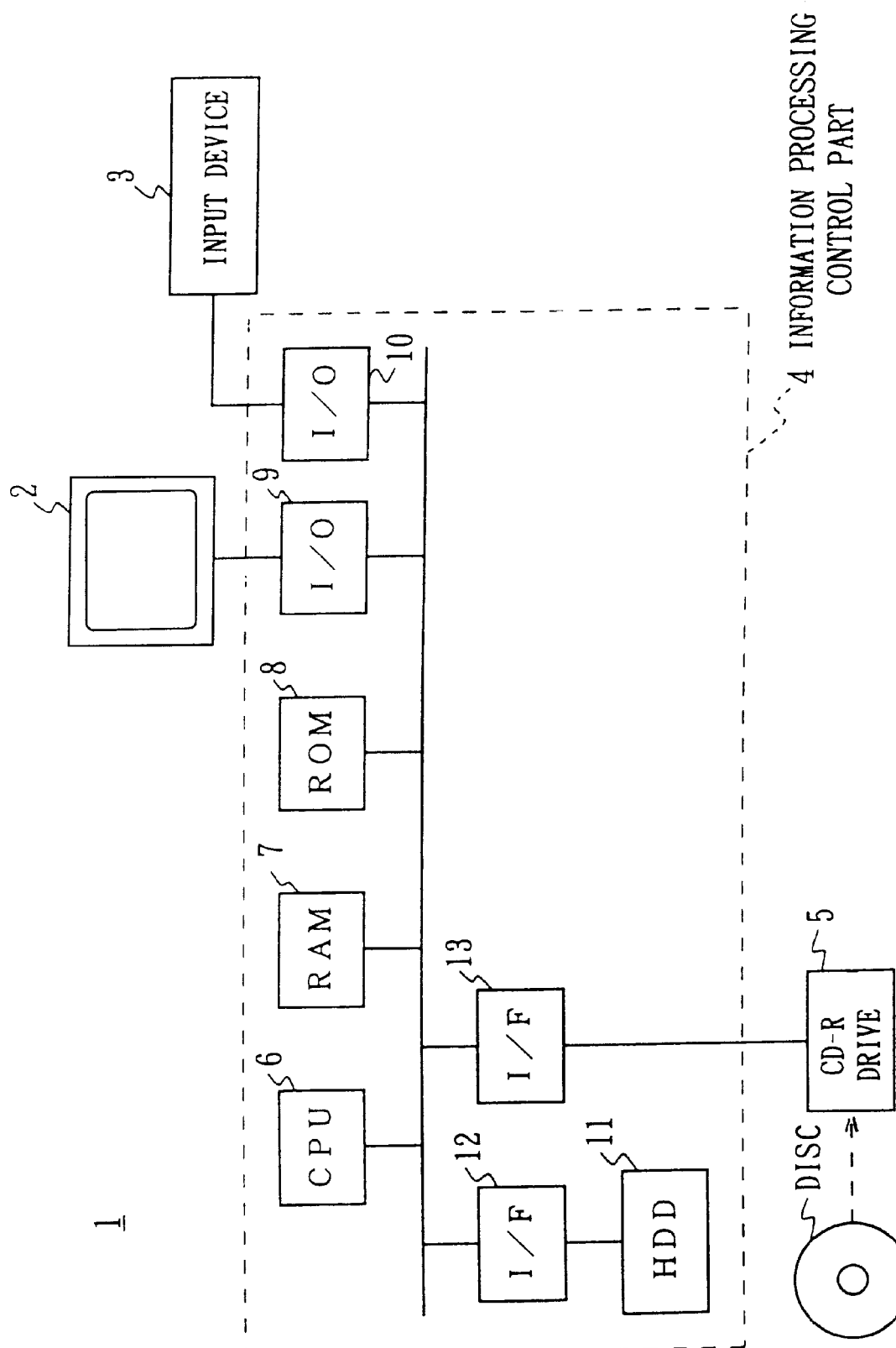
FIG. 1 is a block diagram showing an overall structure of a CD-R disc device according to the present invention.

In FIG. 1, reference numeral 1 denotes a CD-R disc device as a whole comprising an information processor 4 for processing data to be written on the CD-R disc DISC or data read from the CD-R disc DISC, a display 2 comprising a cathode ray tube or a liquid crystal display device for supplying processed data, processing state of the information processor to the user, input device 3 comprising a keyboard for entering data to the information processor 4, and a CD-R drive device 5 for writing and reading data to the CD-R disc DISC.

The information processor 4 has respectively a CPU (Central Processing Unit) 6 for controlling an operation of a system as a whole, a RAM (Random Access Memory) 7, a ROM (Read Only Memory) 8 in which basic program is housed required for the operation of the CPU 6, an I/O circuit 9 for outputting information to the display 2, an I/O circuit 10 for fetching information from the input device 3, a hard disc drive (HDD) 11 for accessing a hard disc in which each kind of program is housed, an interface circuit (I/F) 12 for accessing the HDD 11, an interface circuit (I/F) 13 for accessing the CD-R drive 5. Incidentally, the RAM 7 includes a cash buffer function in addition to a simple memory function.

In the information processor 4 having such a structure, the CPU 6 reads the program of the file system (CDRFS: Compact Disc Recordable File System) for the CD-R via an interface (I/F) 12 from the hard disc 11 on the basis of a program memorized in the ROM 8 and stores the program in the RAM 7. Then the CPU 6 starts up the system by actuating the CDRFS which is read.

When the data is recorded in the CD-R disc DISC with respect to the CD-R disc device 1 which has been started up, the CPU 6 converts the data prepared by the user into blocks in a predetermined format so that the data is sent to the CD-R drive via the interface circuit 13 while at the same time giving a writing instruction to the CD-R drive 5. The CD-R drive 5 which accepts the instruction records the accepted data subsequently to the CD-R DISC in the data unit of writing which is referred to as a packet.

In addition, when the data recorded in the CD-R disc DISC is read, the CPU 6 in the information processor 4 gives a reading instruction to the CD-R drive 5 via the interface circuit 13. The CD-R drive 5 which accepts the instruction accesses the CD-R disc DISC to read data which is recorded in the packet and sends the data to the RAM 7 via the interface circuit 13.

Figure 2:
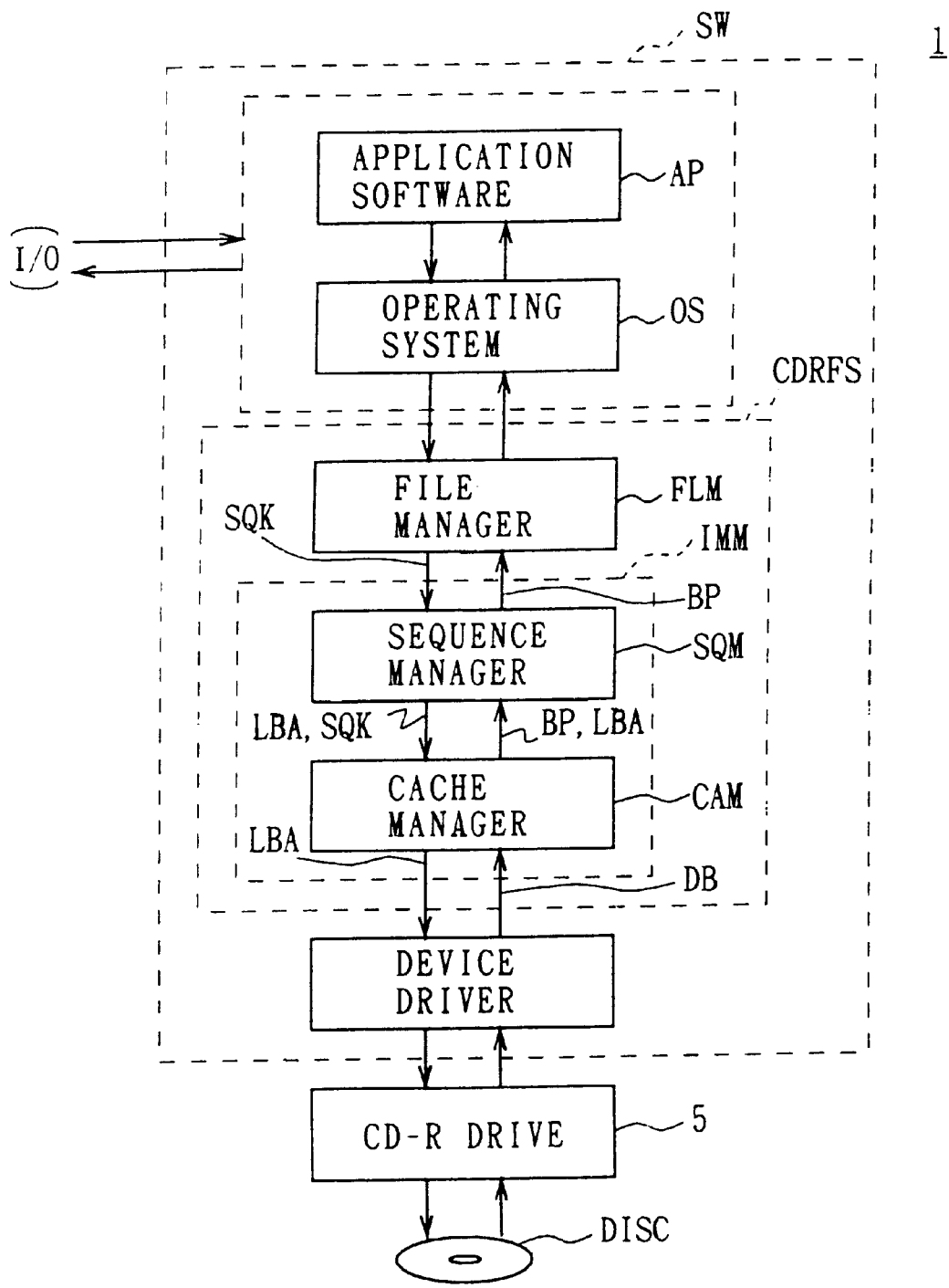
FIG. 2 is a block diagram showing a structure of a CDRFS according to the present invention.

FIG. 2 shows an overall structure of a software SW which looks like a recordable recording medium to the user. An instruction from the user input via the I/O is interpreted in the application software AP and in the operating system OS, and the instruction is delivered to the file manager FLM of the file system CDRFS for use in the CD-R.

The file system CDRFS comprises a file manager FLM which constitutes an upper layer part and an imaginary device manager IMM which constitutes a lower layer part. The file manager FLM controls the directory and the files. Consequently, when a file overwriting command is delivered to the file manager FLM from the operating system OS, a corresponding imaginary address space is designated which is formed in the imaginary device manager IMM on the basis of the file name designated by the instruction.

Figure 3:
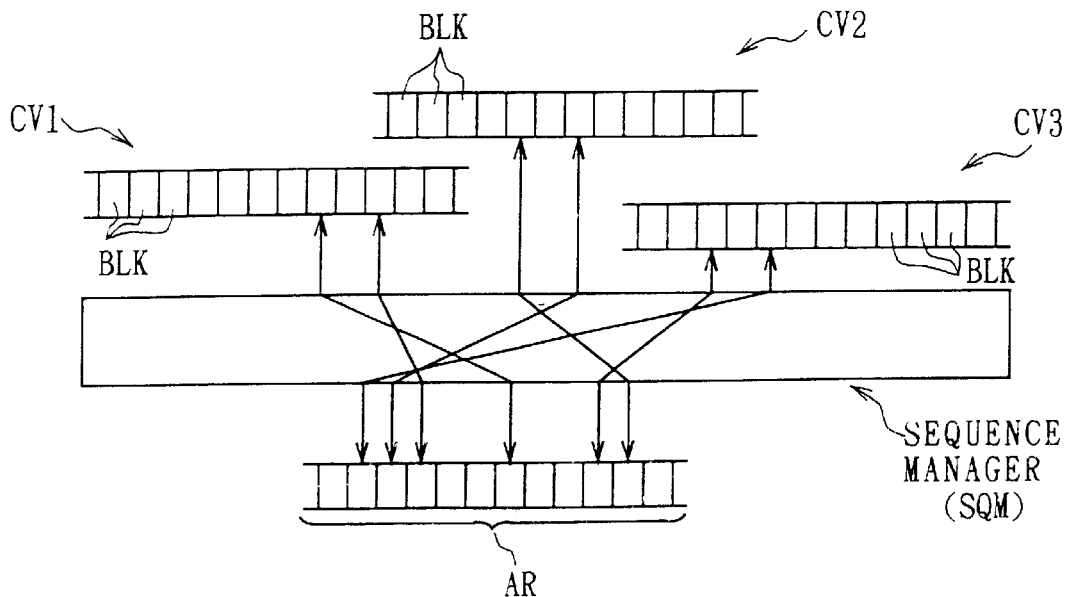
FIG. 3 is schematic diagram dedicated for the illustration of the control of a plurality of address spaces by means of a sequence manager SQM.

Here, the imaginary manager IMM provides a plurality of imaginary address spaces CVx (CV1, CV2, CV3, . . . ) to the file manager FLM as shown in FIG. 3. Each of the imaginary address spaces CVx comprises a data block line comprising a single data block or a plurality of data blocks. This data block line is referred to as a sequence, and corresponds to each file controlled by the file manager FLM. Consequently, the file manager FLM designates an imaginary address space CVx of the target file by designating the sequence number to the imaginary device manager IMM. At this time, the file manager FLM can designate the imaginary address space CVx in block units with a 64-bit long logic address which is referred to as the sequence key SQK (FIG. 2).

In other words, the imaginary device manager IMM is constituted so that each imaginary address space CVx is controlled with the sequence key SQK, and 32 bits in the upper place of the sequence key SQK are assigned with a sequence number unique to the imaginary address space CVx, and 32 bits in the lower place constitute a sequence block number for designating a block BLK (FIG. 3) in a sequence (an imaginary address space) designated in 32 bits in the upper place. Consequently, the block number (namely, the block number which can be held by each imaginary address space CVx) which can be controlled with the sequence block number is $2^{32}$ blocks per one imaginary address space (one sequence). Each block BLK is 2048 blocks in agreement with the CD-R disc format so that the imaginary device manager IMM can control even a device having a size of 8 tera bytes as the upper limit as one sequence (namely, one file).

In this manner, the imaginary device manager IMM is constituted so that each imaginary address space CVx constitutes a file by providing each imaginary address space CVx in correspondence to the file. Consequently, the imaginary address space IMM can immediately access the file without executing a complicated procedure in which the file position is converted into a logical address to be searched when the file is designated.

Thus, when a logical address which directly corresponds to the file represented in the 64 bit long sequence key SQK from the file manager FLM is delivered to the imaginary device manager IMM, the sequence manager SQM of imaginary device manager IMM (FIG. 2) corresponds the logical address represented by the sequence key SQK to the physical address on the CD-R disc by using the searching method by means of the multiway tree called B star tree.

Figure 4:
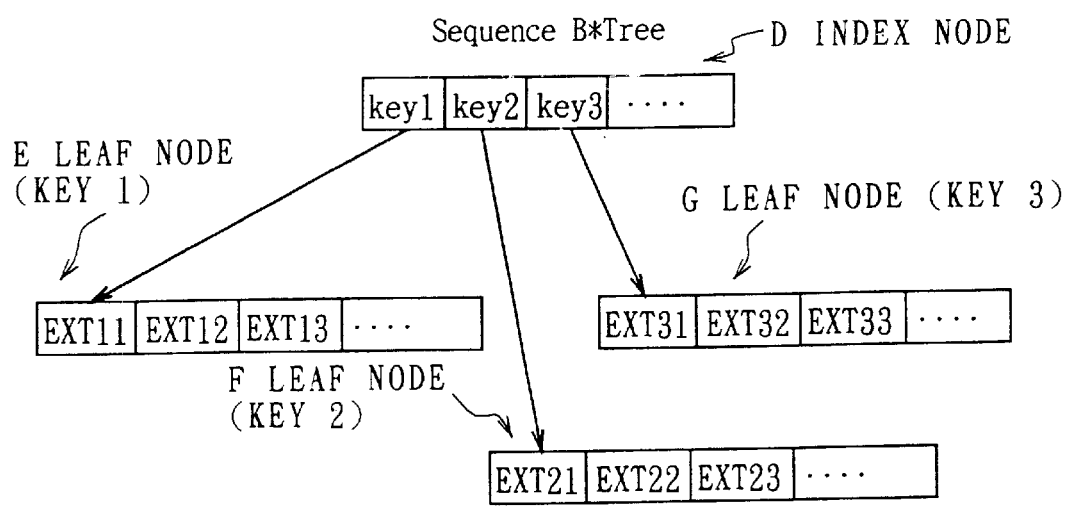
FIG. 4 is a schematic diagram dedicated for the illustration of the control mechanism by means of the B star-tree.

In other words, the B star tree of the sequence manager SQM has a tree structure as shown in FIG. 4, and comprises an index node as an intermediate node (branch) and leaf nodes E, F and G having an extent (EXTx) designating a correspondence between the logical address and the physical address.

Each of the leaf nodes E, F and G stores a single sequence key SQK and a plurality of sequence keys SQK in the sequence order designating a relation between the logical address and the physical address LBA designated by the sequence key SQK. In other words, the extent EXTx controls as one unit a block line in which the sequence SQK is continuously arranged at the physical position on the CD-R disc. The extent EXTx comprises the sequence SQK in the front block and the physical address LBA corresponding to the sequence SQK and a length. The length represents a continuous physical address LBA block number represented by the extent EXTx with the physical address placed at the front thereof. Consequently, for example, when the extent EXTx is represented by (0,0 56 5), the physical address LBA on the CD-R disc corresponding to the sequence key SQK (logical address) which is referred to as 0,0 is 56, which represents that the data represented by the extent continues 5 blocks with the physical address LBA (=56) placed at the front on the CD-R disc.

The 5 data blocks controlled by this one element EXTx is written on a physical area which continues on the CD-R disc so that it is possible to avoid an increase in the number of extent EXTx which constitutes an element of an address conversion table of the logical address and the physical address by recording data of the same file on the continuous physical address LBA. In actuality, when attention is paid to the fact that the probability is high that the same file is processed in a continuous manner, the block of the continuous sequence SQK is continuously written on the physical position on the CD-R disc with the result that the number of the extent EXTx itself can be reduced which serves as an element constituting a control structure of the sequence manager SQM. For example, when the extent EXTx is (0,0 56 5), the data (for example, two blocks) having the same sequence number (file) is continuously written, the extent EXTx (0,0 56 7) is provided with the result that the extent EXTx as the control data does not increase.

In FIG. 4, in the extent node D constituting the intermediate node of the B star-tree, the sequence key SQK (key 1, key 2, key 3 . . . ) of each front extent information of each of the corresponding leaf nodes E, F or G is housed together with the node number. When the sequence keys (key 1, key 2, key 3 . . . ) are designated, the corresponding leaf nodes E, F or G are read from the physical address on the CD-R disc by referring to the node table (FIG. 5).

Consequently, the sequence manager SQM searches from the index node when the sequence key SQK is designated the front key (sequence key SQM) in a range in which the sequence key SQM is included. For example, when the target sequence key SQM is a value between the first sequence key key 1 and the second sequence key key 2 housed in the index node D, the sequence manager SQM selects the leaf nodes E, F and G starting from the extent EXT 11 having the first sequence key SQK key 1 so that the inside of the leaf node is sequentially searched. In this manner, a plurality of extent nodes EXTx in each of the leaf nodes E, F and G are capable of searching the physical address of the data line designated by the desired sequence key easily by using the method of the B star tree.

Figure 5:
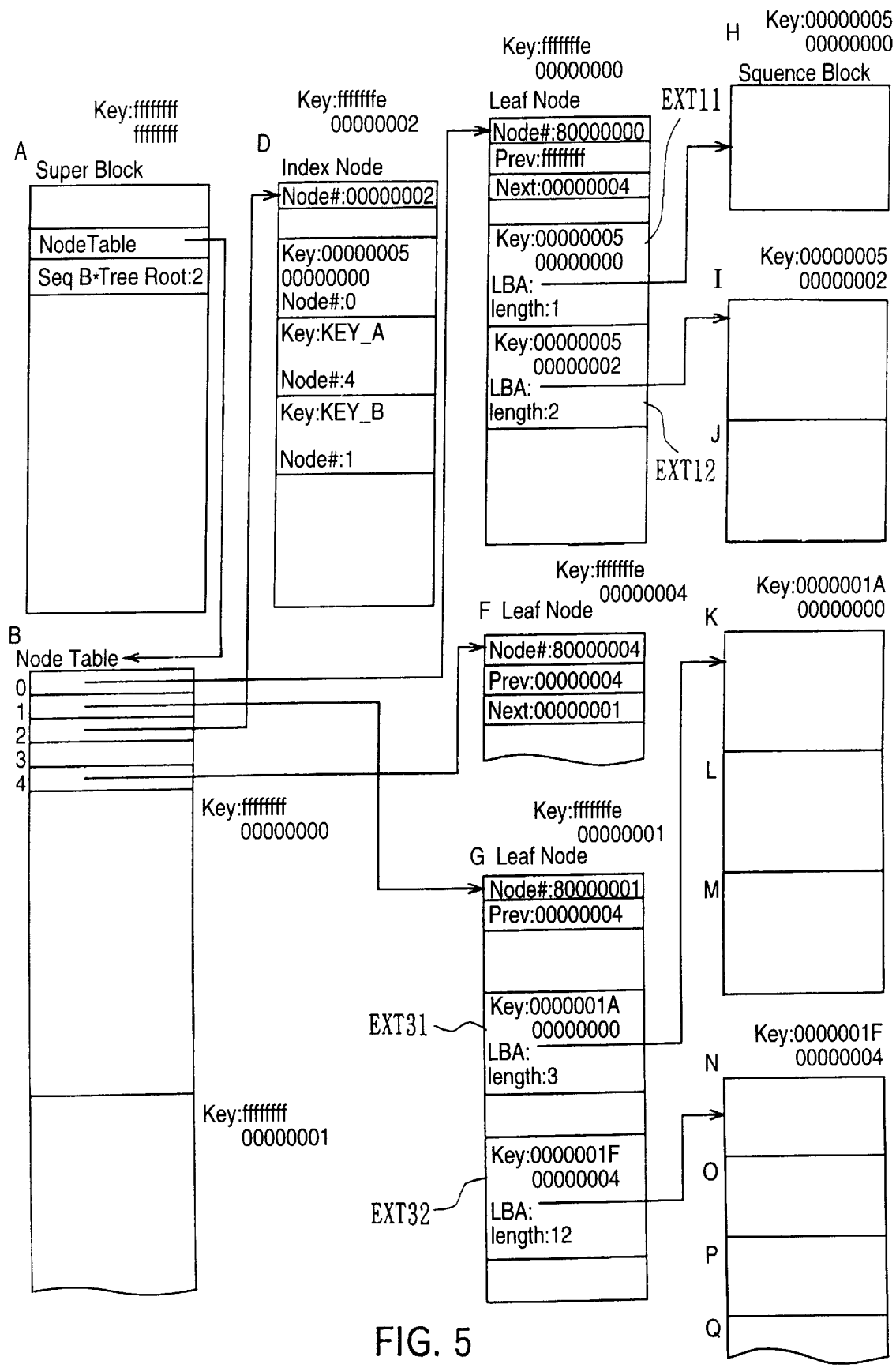
FIG. 5 is a schematic diagram dedicated for the illustration of the control mechanism by means of the B star-tree.

For reference, FIG. 5 shows a searching method by means of the real B star tree so that the physical address LBA (H, I, J, . . . ) on the target CD-R disc is searched from the super block (referred to as SVD), the node table (Node Table) B, the index node D and leaf nodes E, F and G which are recorded on the CD-R disc. In other words, the sequence manager SQM refers to the node table B on the CD-R disc on the basis of the physical address on the node table B which is recorded on the super block. At the same time, the sequence manager SQM creates a physical address LBA of the index node from the node number of the node table B designated by the root node number which is recorded on the super block. As a consequence, the sequence manager SQM can refer to the index node D on the CD-R disc to determine the node number corresponding to the desired sequence key in the index node as described above with respect to FIG. 4. In this index node D, the node number corresponding to the sequence key SQK is read so that the leaf nodes E, F and G corresponding to the node number reads the physical address LBA in the node table B. As a consequence, the target leaf nodes E, F and G can be read from the CD-R disc so that the extent EXTx corresponding to the sequence key SQK designated at this time can be read. With this extent EXTx, the position (H, I, J) on the CD-R disc in the target data block line is obtained EXTx is determined.

For reference, FIG. 6 shows an example of a correspondence relation between the sequence number and the physical address LBA. These four correspondence relations can be represented by one extent EXTx represented by the sequence number (123456781h), LBA (1000h), and the length. Each control data constituting the B star tree is recorded on the CD-R disc with the result that there arises a need of rewriting data along with the renewal of the content. Consequently, with respect to the data block constituting the B star tree a correspondence table between the logical address and the physical address LBA, the 32 bit-long logical address which is called the B star tree is attached to control the correspondence table between the logical address and the physical address as an arrangement table in which the logical address is used as a subscript.

FIG. 7 shows an example of a node table. It is possible to see from this node table that the B star tree of the node number "0" is recorded on a position where the physical address LBA is located at a position of "30". Two data are attached in addition to the arrangement table of the node table. In other words, the "number of entry" designates the number of elements in the arrangement whereas "free" shows the head of the unused elements in the arrangement. The list of unused elements refers to the control mechanism of the unused element in the arrangement. With the mechanism, the reuse of the arrangement element can be simplified. The content of the last unused elements contains the subscript of the next unused element in place of the block address. In this example, table 2 is placed at the head of the unused element list followed by the following table 4 and table 1.

The node table is constituted so that a mechanism for controlling the node table is omitted by recording the node table on a continuous area on the CD-R disc. In the case where the B star tree is changed and the block constituting the B star tree is rewritten, the renewed node table is written on the CD-R disc. For example, when the maximum number of the block number of the B star tree required for controlling one giga byte-long data is controlled becomes 8095 blocks as shown in FIG. 8 because each extent EXTx refers to one block and it is favorable to consider that only a half of each node is used. Since four bytes are required in the arrangement table having the logical address as the subscript, the size of the table will be 16 blocks as shown in the following equation;

$$8095\ blocks \times 4\ bytes + 2 \times 4\ bytes = 32388\ bytes = 15.8\ blocks \approx 16\ blocks \quad (1)$$

In the case where one giga space is controlled, it can be seen that the continuous area required as a control table of the B star tree is 16 blocks at most. In the CDRFS, a packet comprising 32 blocks is used as a recording unit for recording on the CD-R disc. The node table comprising 16 blocks at most is housed in one packet. Consequently, in the CDRFS this node table is housed together with other control information in the last packet which is written in the CD-R disc at the time of the flash operation which will be described later.

In this manner, in the CDRFS, the logical and physical address control mechanism of the data block has a dual structure comprising the B star tree and the node table. The reason for constituting such a dual structure is that when only the logical and physical address control mechanism by means of a simple arrangement is used like the node table, a large continuous area is required for the display. For example, when the case of the control of one giga space like the aforementioned example is considered, 1024 blocks of continuous area is required as shown in the following equation;

$$1 \times 2^{20}\ kbyte/2\ kbyte \times 4/2048\ kbyte = 1024\ kbyte \quad (2)$$

Furthermore, when an attempt is made to control one giga space only with the B star tree, the node of the B star tree is referred to with the physical address LBA with the result that the rewriting of the reference affects the node of other B star tree every time the node of the B star tree is renewed. Consequently, in the CDRFS, the logical and physical address control mechanism has a dual structure comprising the B star tree and the node table.

Thus, in the sequence manager SQM, when the physical address LBA having the sequence recorded is determined from the searching method (B star tree) described with respect to FIGS. 4 and 5, the physical address LBA is delivered to the cash manager CAM shown in FIG. 2 together with the sequence key SQK.

The cash manager CAM reads and writes data from the CD-R disc of the data block corresponding to the designated physical address LBA via a cash buffer which is called cash block. In other words, the designated physical address LBA and the sequence key SQK are delivered to rewrite data, the cash manager CAM judges whether or not the data block represented by the designated physical address LBA is already present in the cash buffer. Here, when a negative result is given, the cash manager CAM reads data from the block (cash block) in the cash buffer, and stores the data in the block in the cash buffer so that the temporary physical address (Temporary LBA) is allocated to the housed data block. In this manner, the sequence manager SQM can access the data block without an awareness as to whether the position of the physical address is real or temporary by controlling the address with the temporary physical address (Temporary LBA).

Furthermore, at this time, when the cash manager CAM memorizes the sequence key SQK (delivered from the sequence manager SQM) with respect to the data block to deliver the data pointer with respect to the cash block having the block data housed and the temporary physical address to the sequence manager SQM. The sequence manager SQM registers the correspondence relation between the temporary address (Temporary LBA) and the sequence key SQK in the B star tree.

At the same time, the data pointer of the cash block delivered from the cash manager CAM is delivered from the sequence manager SQM to the file manager FLM so that the data designated by the user is renewed. The data block which is rewritten in this manner is delivered to the cash manager CAM so that the block is controlled as a renewed block which is called a dirty block in the Write Cache Block which comprises a high speed memory. At this time, the dirty block is either renewed or prepared in the cache buffer and is not yet recorded in the CD-R disc. Consequently when the dirty block reaches a predetermined number (32 blocks), the cache manager CAM writes the dirty block on the CD-R disc DISC via a device driver as one packet.

In the case where the same data block is renewed with respect to the data block again before the data is written on the CD-R disc by allowing the dirty block to remain in the write cache block until one packet portion of the dirty block is detained, only the data in the cash buffer (namely, writing of a new physical address LBA) is rewritten so that the renewal of data on the CD-R disc can be avoided.

The aforementioned explanation is concerned with a processing for rewriting the data block which exits already on the CD-R disc. The file manager FLM rewrites data while looking at only the temporary address by means of the temporary device manager IMM (FIG. 2). Consequently, even when a write once type CD-R disc is used as a recording medium, the file manager FLM can rewrite data in the temporary address space like an operation with respect to the rewritable media.

On the other hand, in the case where data block is newly generated, the sequence manager SQM requests the cash manager CAM to generate a block by delivering the sequence key SQM of the block which is to be generated. The cache manager CAM allocates the block in the cache and allocates a temporary physical address (Temporary LBA) to deliver the address to the sequence manager SQM. At this time, the sequence key SQK delivered to the cache manager CAM from the sequence manager SQM is memorized in the control table of the cache buffer in the cache manager CAM and the sequence key SQK is used at the time of the writing operation on the actual CD-R disc. The sequence manager registers the correspondence between the sequence key SQM of the block which is to be generated and the physical address brought back from the cache manager CAM in the control structure comprising the B star tree.

Furthermore, on the other hand, in the case where the data block is erased, the sequence manager SQM determines the physical address of the designated sequence key from the B star tree to designate the ensure to the cache manager CAM. The cache manager CAM performs no processing when the block of the physical address LBA does not exist in the cache buffer. On the other hand, in the case where the block of the physical address LBA exists in the cache buffer, the cache manager CAM nullifies the cache block (namely, the block in the cache buffer controlled by the cache manager CAM). Then, lastly, the sequence manager SQM erases the entry of the sequence key SQK to be erased from the B star tree to complete the erasure thereof.

Here, an operation of writing data of the write cache block on the CD-R disc is referred to as a "flash". Firstly, when the sequence manager SQM receives the flash request from the file manager FLM, or secondly when the sequence manager SQM receives the writing request from the cache manager CAM, the flash operation is carried out.

The first case depends on the external factor of the CDRFS, that is the case when the flash request is received from the application, the CD-R disc is inserted, or the system is completed. On the other hand, the second case depends on the internal factor of the CDFRS, that is the case where the reusable block in the cache does not satisfy the least number required for ensuring the operation of the CDPRS, or writing on the CD-R disc is needed for ensuring the reliability of the CDRFS.

The case in which the number of reusable blocks in the cache does not satisfy the least number required for ensuring the operation of the CDRFS refers to a case in which the reusable blocks sufficient for writing, generating, renewing and eliminating of the sequence block which is a basic operation of the sequence manager SQM are not secured in the cache block. Consequently, when sufficient reusable blocks are not secured in the cache block, the reusable blocks are secured in the flash operation. Incidentally, the reusable blocks are a general name of write cache blocks (referred to as read cache blocks) obtained by writing the data of the write cache blocks on the CD-R disc and cache blocks (referred to as Free Cache Blocks) in which no effective data is stored.

Here, the number of reusable blocks which are required for the operation of the sequence manager SQM will be explained. In other words, when the sequence blocks are read, the target data blocks and the reusable blocks for storing the B star tree control structure for examining the physical address where these blocks are present are required in the cache buffer. These B star tree blocks are not referred to at the same time at the time of the retrieval with the result that only one reusable block is present. Consequently, the maximum value RBCmax of the reusable blocks in the cache buffer required for the reading processing of the sequence blocks will be represented in the following equation:

$$RBCmax(N)=N+1 \tag{3}$$

wherein N represents the number of data blocks which are to be originally read.

At the time of the generation, renewal of the sequence blocks, unwritten blocks are assigned in the cache buffer. In actuality, since the sequence manager SQM renews the B star trees, data blocks for storing the node of the B star trees are generated and renewed so that the reusable blocks more than the number of the target blocks are required in the cache buffer. In addition, there is a possibility that the data block is generated along with the renewal of the B star tree at the time of the erasure work. In this case, the reusable blocks are required.

Furthermore, at the time of the generation of the sequence block, the extent EXTx is generated and is inserted into the B star tree. When there is no allowance in the leaf node to which the extent EXTx is inserted, the leaf node is divided and one data block is generated for a new leaf node. Furthermore, when no allowance is generated in the index node to which the leaf node is inserted at the time of inserting into the index node the generated leaf node for the division, a new leaf node is generated for dividing the index node. In the case where depth of the B star tree is 3, the total volume of data that can be controlled can be represented in the following equation:

$$170\times170/2\times145/2=2095250\approx2 \text{ (Gbyte)} \tag{4}$$

in the state in which all the nodes other than the route are written by ½ in consideration of the least efficient state in which the number of blocks which one extent EXTx is controlled is one. Consequently, in the CD-R disc when the volume is less than 700 megabytes, the route node of the B star tree having the depth of 3 is not divided, the number of data blocks which is generated along with the insertion of the first extent EXTx into the B star tree will be 2 at most.

Furthermore, since the index node immediately after the division is embedded up to ⅔ at most, it is required to newly insert $^{170}/_3$ indices at least to fill the index nodes. Furthermore, when the adjacent index nodes are not filled, index nodes are moved to average the number of respective indices instead of division. Consequently, the least number of times of the insertion of the index nodes into the B star tree which is required from the generation of the division of the index nodes until the next division will be $^{170}/_3\times2=113$. Furthermore, in the case of the leaf nodes, the insertion of at least $^{145}/_3\times2$ extents EXTx is required for generating the next division in the same manner. Thus the maximum value CBCmax of the data block number generated by the call of one time block generation with respect to the sequence manager SQM will be represented by the following equation:

$$CBCmax(N)=N+2(N/96)/113+(N/96) \tag{5}$$

wherein N represents the number of data blocks which are to be originally renewed.

Figure 9A:
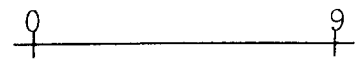
FIGS. 9(A) and 9(B) are schematic views dedicated for the illustration of the renewal of the data bloc.
Figure 9B:

On the other hand, in the case of the renewal of the data blocks, the work is the same as the case of the block generation except for the work of removing the extent EXTx. In other words, in the case where one part of the extent EXTx is removed by controlling the correspondence relation between the sequence key SQK of a plurality of consecutive blocks and the physical address LBA, the number of the extent EXTx will sometimes increase by one extent. For example, when the extent EXTx as shown in FIG. 9(A) is present, this extent will be exchanged by two extents as shown in FIG. 9(A) by removing the data block from the extent to renew the data blocks from the sequence keys "3" to "6". In this manner, when one part of the extent which is already present is removed, another one surplus extent may be present. In consideration of this fact, the maximum value MBCmax of the data block number generated by the one time call of the renewal of the blocks with respect to the sequence manager will be represented by the following equation:

$$MBCmax(N)=N+2+((N+1)/96)/113+((N+1)/96) \tag{6}$$

wherein N represents the number of data blocks which are to be originally renewed.

Furthermore, in the elimination of the data blocks, there is a possibility that the leaf nodes are divided when one part of the extent is eliminated. Consequently, the maximum value DBCmax of the data block number generated by the one time call of the elimination of the blocks with respect to the sequence manager SQM will be represented by the following equation irrespective of the number of data blocks to be eliminated;

$$DBCmax=2 \quad (7)$$

Furthermore, in the case where the data size to be treated in one time operation is not determined, it sometimes happens that a complicated calculation such as equations (3) through (7) is not required. For example, in the case of Windows 95 (trade name), when the allocation unit is read from the file system with [GetDiskInfo], an access can be made to the file system in the allocation unit. Consequently, when it is supposed that the allocation unit is set, for example, to 32 blocks, the number of data blocks which should be operated at one time with the sequence manager will be less than one packet. Thus the block number will be represented by the following equation;

$$DBCmax<CBCmax(32)=MBCmax(32)=34 \ (block) \quad (8)$$

Before the operation of the sequence manager SQM, 34 reusable blocks may be present in the cache buffer.

Figure 10:
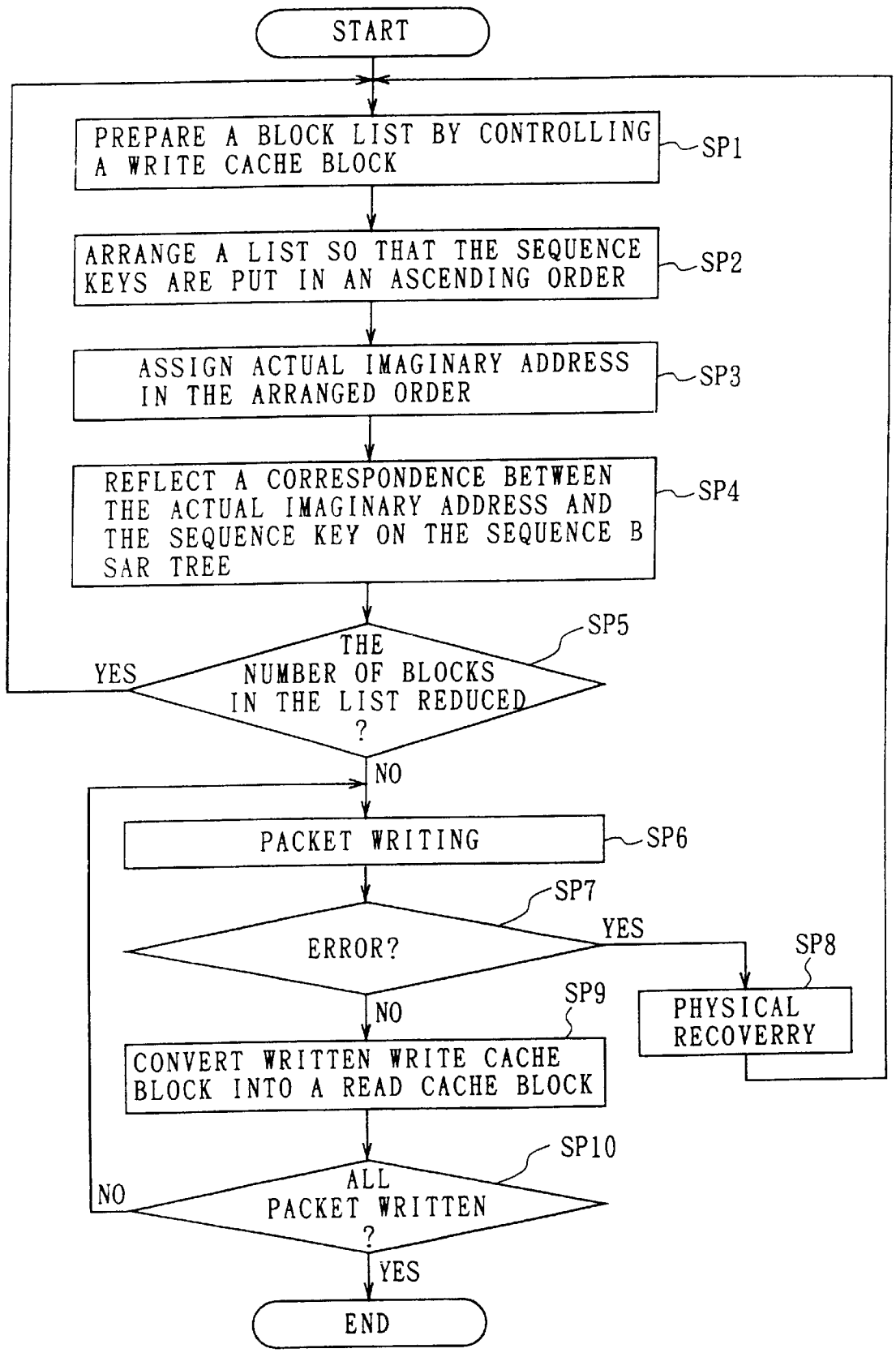
FIG. 10 is a flowchart dedicated for the illustration of a flash operation.

A flash operation for writing the data in the write cache block on the CD-R disc DISC will be explained. As shown in FIG. 10, the sequence manager SQM requests the cache manager CAM to collect n packets of write cache blocks in the cache buffer. The number n of packets in this case depends on the setting of the cache manager CAM.

The cache manager CAM prepares a list of blocks to be written on the CD-R disc DISC in accordance with a predetermined priority from among the write cache block in accordance with the request at step SP1 of FIG. 10. This priority is determined by using a so-called LRU (Least Recently Used) algorithm in which a priority is given to the block having less access to the target block with the result that cache out block (to be written on the CD-R disc) is determined in the order of higher priority. Here, when a vacancy is generated in the packet, the cache manager CAM assigns a dummy block to the vacant area.

The cache manager CAM refers to the cache control table at step SP2 with respect to the write cache block which is selected in this manner so that the block list of the write cache blocks are arranged in order so that the sequence key SQK is placed in order which corresponds to the write cache block. Then at the following step SP3, scheduled physical address (Contact LBA) on the CD-R disc where each block is written from the block list is assigned like the write start physical address LBA and the write start address LBA+1. This scheduled physical address (Contact LBA) will become an actual address (Real LBA) which is established on the CD-R disc when the writing is normally completed. When the writing is failed, the aforementioned temporary physical address will be provided.

Thus, at step SP3, the probability will become high that the block of the same sequence will be arranged on the continuous area on the CD-R disc by assigning the writing position to the order of the SQM in order with respect to each write cache block. As a consequence, the block can be continuously read from the CD-R disc at the time of reading with the result that the reading performance will be heightened. At the same time, an increase in the number of elements of B star tree can be prevented in which physical continuous block of the same sequence (files) are controlled with one extent EXTx.

Thus, when the scheduled physical address (Contact LBA) is assigned to the write cache block at step SP3, the sequence manager SQM receives a correspondence table of the sequence key SQK and the scheduled physical address (Contact LBA) assigned from the cache manager CAM so that the B star tree is renewed at step SP4. In other words, at step SP4, the temporary physical address (Temporary LBA) of the extent EXTx prepared by assigning the temporary physical address at the time of the data renewal in advance is replaced with the scheduled physical address (Contact LBA; Temporary Actual address). The scheduled physical address (Contact LBA) is assigned with the sequence key SQK in order so that some extent EXTx is summarized by the execution of a plurality of such renewal thereby reducing the number of the extent EXTx of the B star tree as a whole. As a consequence, in some cases, a part of the nodes (leaf nodes and intermediate nodes) which constitute the B star tree will be eliminated. Consequently, at step SP5, the sequence manager SQM judges whether or not the number of blocks which constitute the B star tree has been decreased or not. When an affirmative result is obtained here, this represents that write cache blocks having a low priority which are not selected by the LRU (Least Recently Used) algorithm at the aforementioned step SP1 in place of the decreased block can be included. At this time, the sequence manager SQM returns to the aforementioned step SP1 to repeat the selection of the write cache block again.

Thus, by repeating the processing at steps SP1 through SP5 a negative result will be obtained at step SP5. The cache manager CAM moves to step SP6 to send the packet data comprising a plurality of blocks collected in the write cache buffer to the CD-R disc via a device driver with the result that the data is written on the CD-R disc in a new writing area in the packet unit.

Here, an writing error to the CD-R disc is generated, an affirmative result is obtained at the subsequent step SP7. At this time, the sequence manager SQM and the cache manager CAM moves to step SP8 to perform a physical restoration to the CD-R disc. In other words, in the CD-R disc device, it is stipulated in the specification that the data is written in the packet unit. It becomes necessary to embed the packet with dummy data with respect to the packet in which a writing error is generated and the record data is interrupted.

Consequently, the sequence manager SQM and the cache manager CAM restores incomplete packets with dummy data and record again data that should be recorded as the packet with the dummy data. At this time, the physical address LBA of the data to be written is changed so that the sequence manager SQM and the cache CAM manager returns to the aforementioned step SP1 where the data of the unwritten write cache block is collected again and a new scheduled physical address (Contact LBA) is assigned to the new scheduled physical address (Contact LBA). Incidentally, with respect to the packet where the writing is completed before the error generation the data included in the packet is already changed into a unrenewed data block called read cache block in the cache buffer so that the data block does not become an object to be recollected by the write cache block after step S8. Consequently, every time the packet writing is succeeded, the data scheduled to be written (write cache block) decreases so that all the data blocks will be finally written on the CD-R disc.

Thus, at step SP7, the cache manager CAM changes the write cache block corresponding to the cache buffer into a reach cache block with respect to the packet in which a negative result is obtained (packet in which writing has been succeeded). At the following step SP10, the processing at steps SP6 through SP9 is repeated until the result having all the packet written is obtained.

Here, FIG. 11A shows a recording state of the data onto the CD-R disc. In the multi-session packet recording method, a plurality of sessions (Session 1, Session 2, . . . ) are subsequently recorded from the inner periphery to the external periphery on the CD-R disc in a spiral manner. On the inside of the recording area, a power calibration area (PCA) and a program memory area (PMA) are secured so that information for power adjustment and control information in each session can be recorded.

Each session comprises a program area in which block data of the sequence (file) prepared and renewed by the user, and a lead-in area in which lead-in information representative of the start of the session and lead-out information representative of the end of the session is recorded. Incidentally, the lead-in information and the lead-out information is to be recorded after one session portion of the file data is recorded in the program area. The information is intended to have compatibility with the CD-ROM.

As shown in FIG. 11(B), the program area is further divided. In the case of the 3 data track, the program area is divided into three tracks. At this time, the head of each track is provided with an index area (Index) and index information of the track is recorded on this part. Further, as shown in FIG. 11(C), the track comprises a collection of packets which constitutes a basic unit of data writing. As shown in FIG. 11(D), each packet is divided into four parts, a link block, a run in block, a user data block having user data such as file information or the like and a run out block.

Here, as data to be recorded on the program area shown in FIG. 11(A), information showing a data control structure is present in addition to the block data (user data) of the sequence (file) prepared by the user. As this information, there is available a primary volume descriptor (PVD), a super block, a node table, a B star tree index node, a sequence B star tree index node, and a sequence B star tree leaf node. Incidentally, all the data control structure excluding the node table has a size of one block (2048 bytes) and is recorded in the block boundary. Furthermore, the node table is a variable length data structure having a size of one block or more and the head of the node table starts from the block boundary.

Figure 11:
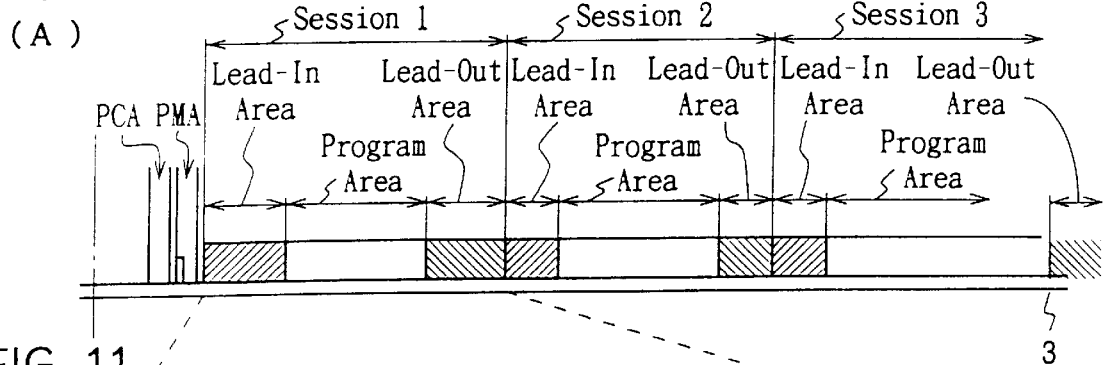
FIGS. 11(A) to 11(D) are schematic views showing a logical structure of a CD-R disc.
Figure 11:
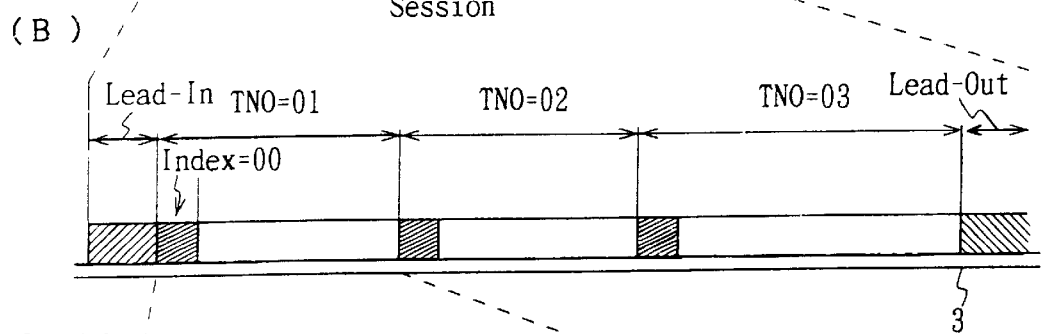
Figure 11:
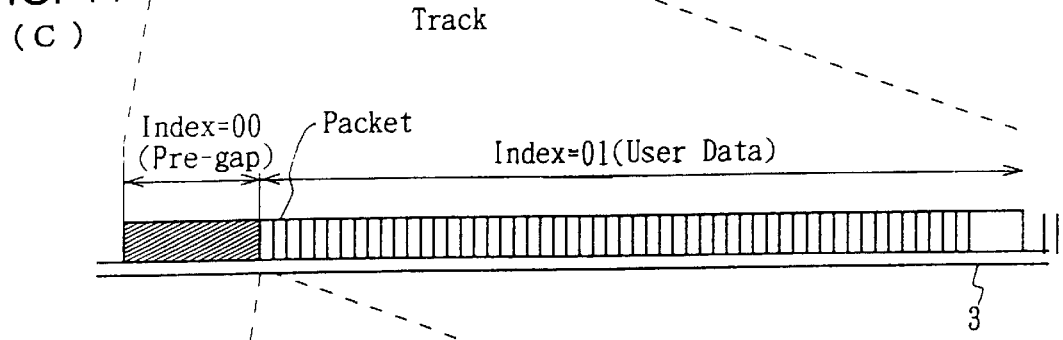
Figure 11:
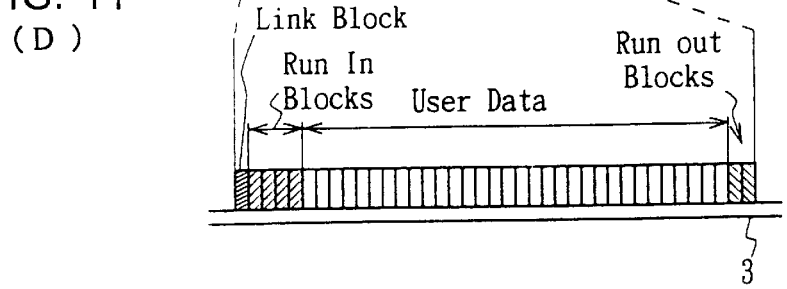

The primary volume descriptor PVD is information which is recorded on the 16th block from the head of the session. At the head 1152 bytes of the 16th block, one which is the same as the 1S09660 PVD is recorded and information unique to CDRFS shown in FIG. 11 is contained. In the PVD of FIG. 12, the Super Block Search Method shows a position where the most recent super block is stored. In other words, the super block is constituted so as to be written on the CD-R disc every time the flash all operation is performed. With the Super Block Search Method of the PVD, the latest position can be detected.

For example, in the case of "Search Method=0", it is shown that the super block is recorded on the block represented by the "Super Block LBA". Furthermore, in the case of the Search Method=1, it is shown that the super block is represented in the "Last Accessible Block". Furthermore, in the case of the "Search Method=2", it is shown that the "Super Block Serial Number" is recorded at the maximum position out of the super blocks recorded on the Super Block Area. Incidentally, "Super Block Area" refers to the total blocks sandwiched between the block represented by the Start LBA of Super Block Area and a block represented by the End LBA of Super Block Area.

Furthermore, when the "File System Flag" shown in the PVD of FIG. 12 is 0×0001, it is shown that "Addressing Method 11" is used. Furthermore, when "the File System Flag" shown in the PVD of FIG. 12 is 0×0002, it is shown that the "ISO9660 Volume" is hidden so as not to be seen from the CDRFS. Furthermore when the "File System Flag" shown in the PVD of FIG. 12 is "0×0003", it is shown that the first track of the session is recorded with TAO (Track At Once) or a variable length packet.

Furthermore, the Packet Size shown in the PVD of FIG. 12 shows the block number of the user data in the fixed length packet. However, this field is effective only when the "Addressing Method II" is used.

Furthermore, the "Volume Capacity" shown in the PVD of FIG. 12 shows the total number of blocks which can be recorded on the CD-R disc after the format. Incidentally, this value is a reference value which is used at the time of returning the information on the total volume of the CD-R disc with respect to the operation system.

Furthermore, FIG. 13 shows a structure of the super block. For example, information representing that the block is a super block is recorded on the first "Super Block Header". In the case of the "Search Method=1", when the Super Block is not recorded on the "Least Accessible Block", an old "Super Block" is searched on the basis of this Super Block Header.

Furthermore, the "Super Block Flags" represents whether or not data effective for the session is recorded or not. "Node Table LBA" shows the block in which the node table is recorded. When the size of the node table is two blocks or more, "Node Table LBA" is sequentially recorded from the block represented by the Node Table LBA. Furthermore, the "Previous Super Block" shows the position of the Super Block which has been previously recorded. In the case of the CD-R disc, the data which has been previously recorded will not be lost from the disc. Consequently, it is possible to know the state of the past volume by keeping track of the "Previous Super Block".

The "Sequence B star tree Root Node Number" shows the node number of the control structure (Sequence S Star Tree) comprising the aforementioned B Star Tree with respect to FIG. 5. In addition, the "Directory B Star Tree Root Node Number" shows the node number of the node of the Directory B Star Tree controlled by the File Manager FLM. The "Serial Number" refers to a sequential number of the super block. Incidentally, the "Serial Number" of the super block generated at the time of the format is "0".

Furthermore, the "Super Block List" is a table in which 50 Previous Super Blocks LBA" are collected in the past. The "Super Block List" comprises a repetition of Super Block List Entry as shown in FIG. 14. The first entry of the Super Block List shows the super block one block before the super block in which the Super Block List is housed. When the number of the past Super Block is less than 50, the entry is filled from the head thereof and the unused entry is filled with "0".

The "Super Block Tag List" is a table of the name label of the past super block. The "Super Block Tag List" comprises a repetition of a tag entry as shown in FIG. 15. In this CDRFS, 24 tags at most can be attached to one CD-R disc. At this time, when the tag is less than 24, the entry is filled from the head and the unused entry is filled with "0".

Furthermore, the Node Table refers to a correspondence table between the node number of each node of the control table (Sequence B Star Tree comprising the B Star Tree and the physical address thereof as described above in FIG. 5. The Node Table has a structure as shown in FIG. 16. This Node Table is recorded sequentially from the head of the data block. When the Node Table cannot be housed in one data block, a sequel to the next data block is recorded.

Furthermore, the index node is a node other than the leaf node of the control structure comprising the B Star Tree. Information shown in FIG. 17 is recorded in the index node. The "Number of Records" shown in FIG. 17 shows the number of index records housed in the leaf node. Incidentally, this index record has a structure shown in FIG. 18, and the index record is sorted in the ascending order of the key and is filled from the "Index Record [0]" in order to be recorded.

In addition, the sequence B Star Tree Leaf Node refers to the node of the B Star Tree for housing the correspondence relation between the sequence key SQM and the physical address LBA, and the Sequence B Star Tree Leaf Node has a structure as shown in FIG. 19. The extent EXTx in this leaf node has a structure shown in FIG. 20, and is sorted in an ascending order to be filled from the Extent Record [0] to be recorded. Incidentally, the number of the extents EXTx in the node is recorded in the Number of Records.

Figures 21, 22, 23:
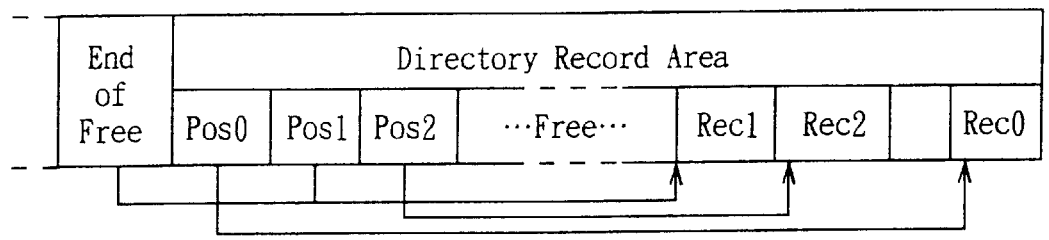
FIG. 21 is a schematic view showing a structure of a directory B star-tree leaf node.
FIG. 22 is a schematic view showing a structure of a directory record area.
FIG. 23 is a schematic view showing a structure of a directory record.

Furthermore, the Directory B Star Tree Leaf Node h is the node of the B Star Tree for housing the file name, the sequence key SQK, a correspondence relation between the directory name and the directory number, and attribute information of the file and the directory, and has a structure shown in FIG. 21. In the "Node Number" in this leaf node, the "Node Number" of the leaf node added with [0×80000000] is housed. The "Number of Records" shows the number of directory records housed in this leaf node. "Previous Node Number" and "Next Node Number" show the Node Number of the leaf node having the least key and the leaf node having the largest key. When no target node exists, [0×ffffffff] is recorded. In the Total Size of Record, the total byte number of the Index Records Offset and the directory record is recorded.

The Directory Record Area is used as shown in FIG. 22. "PosX" is referred to as "Index Record Offset", and shows the position where the directory record is recorded is shown with the byte offset from the head of the directory record area. Incidentally, this "PosX" is one byte. Incidentally, the PosX is sorted in the order of the key held by the directory record shown by the PosX. The PosX is filled from the head and is recorded.

"RecX" is a main body of the directory record. The position is not particularly limited. However, when the algorithm adopted in the CDRFS is used, the directory record which has been recently prepared as a result of the processing is housed at a position most adjacent to the head of the directory area. When the value housed in the "Number of Records" is set to "Nrj", an area between "PosNr-1" and "PosNr-2" is an unused area. This area is used for the renewal and the preparation of the directory record. Incidentally, the unused area is used from the head, and the unused area is from the rear in "RecX".

The directory record refers to the correspondence relation between the file name, the sequence key SQK, the directory name and the directory number, and a variable length data for housing the attribute information of the file and the directory. The directory record has a structure shown in FIG. 23. Incidentally, the directory record is recorded on the directory record area described above. The key in the directory record is assigned to the directory record, and the key is constituted as shown in FIG. 4.

In FIG. 24, the directory number is a number peculiarly attached to each of the directory. All the directory in the same directory has the same directory number. "Hashed Key" refers to a residual obtained when the name of the directory record is divided by the generating function shown by the following equation;

$$P(x)=X^{16}+X^{12}+X^5+1 \qquad (9)$$

This "Hashed Key" becomes the same value with respect to the different name. To avoid this, "Sequential Number" is used in the CDRFS. In the case where the directory record having an equal directory number and an equal "Hashed Key" despite the name different from the directory record which is to be inserted already exists in the B Star Tree, the CDRFS sets to the Sequential Number of the directory record a number obtained by adding 1 to the "Sequential Number" of the directory record which is already present in the B Star Tree.

Furthermore, the size shows a byte number of the directory record including the key and the size itself. Furthermore, the type is a field for showing the type of the directory record. There are five kinds as shown in FIG. 25. Furthermore, apart from this, it is shown that when the bit 7 of the type is erected, the directory record is referred to from one or more Hard Link Directory Record.

Incidentally, structures of the File Directory Record, the Directory Record and the Link Directory Record are shown in FIGS. 26 through 28.

Data (control information) comprising such B Star Tree is written in the user data area (FIG. 11) together with the file data (user data) at the time of writing operation called flash all. In other words, the super block contains the physical address LBA of the block housing the node table, and the route node number of the control structure (FIG. 5) comprising the B Star Tree, and is constituted so that the link to all the data on the CD-R disc excluding the PVD begins with the super block until reaching the file content from the control information. Furthermore, as described above with respect to FIG. 5, the node table is required to refer to the node of the control structure comprising the B Star Tree. Consequently, the Super Block constituting such control structure is written at the time of the flash all operation to the last block one block before the next time writing position of the user area. The timing at which the flash all is carried out is when the predetermined time which is set has elapsed, and more than the predetermined amount of data is written on the CD-R disc. As a consequence, control information (super block) is written on the CD-R disc in a predetermined interval.

Figure 29:
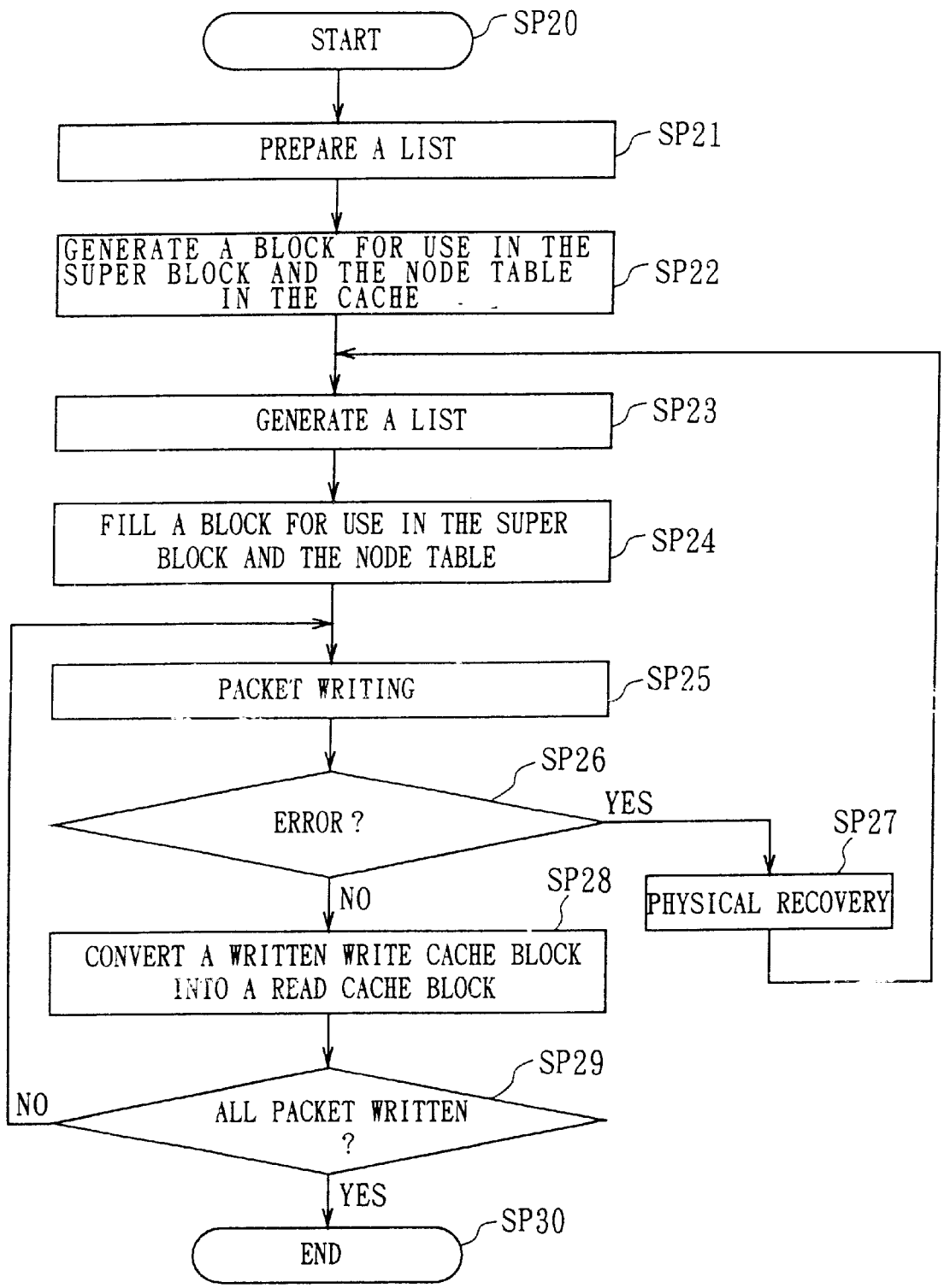
FIG. 29 is a flowchart showing a flash all operation.

FIG. 29 shows an operation procedure of the flash all. The sequence manager SQM and the cache manager CAM enters into the processing procedure from step SP20. At step SP21, a list is prepared in the same manner as the case of the flash operation described above in FIG. 10 with respect to the write cache block in the case buffer. In other words, the sequence manager SQM demands the cache manager CAM to collect all the write cache blocks in the cache buffer. After the cache manager CAM prepares a list of all the unwritten cache blocks and dummy blocks as required, the cache control table is referred to arrange so that the sequence key SQK is put in an ascending order. The scheduled physical address (Contact LBA) is assigned in an order such as the physical address LBA with which the writing is started from the head block of the list thus arranged, and the physical address LBA+1 with which the writing begins.

The sequence manager SQM renews the B Star Tree on the basis of the sequence key SQK and the physical address. The processing of this step is repeated until the block elimination is generated by the renewal of the B Star Tree. Next, at step SP22, the sequence manager SQM demands the cache manager CAM to generate the data block for housing the node block and the super block in the same procedure as the normal block generation. As a consequence, the cache manager CAM generates the super block and the block for the node table in the cache buffer.

Here, for the generation of the block of the node table, "ffffffff0000000(hex)", "ffffffff00000001(hex)" . . . are delivered, and for the generation of the super block, "ffffffffffffffff(hex)" is delivered as the sequence key SQM. In this manner, by attaching the sequence key SQK the node table, the node table is arranged in a continuous area at the time of the block arrangement operation, and the super block is arranged in the last block of the last packet.

Subsequently, the cache manager CAM prepares a list again with respect to the write cache block at step SP23. In other words, the sequence manager SQM demands the cache manager CAM to collect all the write cache blocks in the cache buffer. When there is a data block which is not sent before, the data block is collected again. After a series of processing is performed as usual such as the preparation of the block list by the cache manager, the determination of the physical address LBA and the renewal of the B Star Tree by the cache manager CAM, each content is filled in the super block and the block for the node table at step SP24.

After this, the data is actually recorded in the packet unit after preceding to the step SP25. After the data is all written, the process proceeds to step SP30 thereby ending the flash all operation. Incidentally, since steps SP25 through SP29 are the same as steps SP6 through SP10, explanation thereof is omitted.

In this manner, in the flash all operation, the largest value such as [ffffffffffffffff(hex)] is assigned to the super blocks as the sequence key. On the other hand, such large and continuous values as [ffffffff00000000(hex)], [ffffffff00000001(hex)] and . . . are assigned to the node table as the sequence key. Furthermore, continuous values such as [fffffffe00000000 (hex)], [fffffffe00000001(hex)] and . . . apparently different from the node table are assigned to the leaf node as the sequence key SQK.

These values are extremely large compared with the sequence key SQK [0000000500000000(hex)], [0000000500000002 (hex), . . . ) which are assigned to the block data (user data) constituting a sequence (file) other than the super block, the node table and the leaf node. Consequently, when the flash operation is carried out with the sequence block assigned in this manner, the user data and the control information (super block, node table and the leaf node) is block sorted (rearranged) so that the sequence key SQK is arranged in an ascending order. Thus, the user data and the control information is sequentially recorded on the CD-R disc in the sorting order. As a consequence, control information such as super block, the node table, the leaf node and the like to which large sequence key SQM is assigned are written on the last block of the last packet.

Figure 30A:
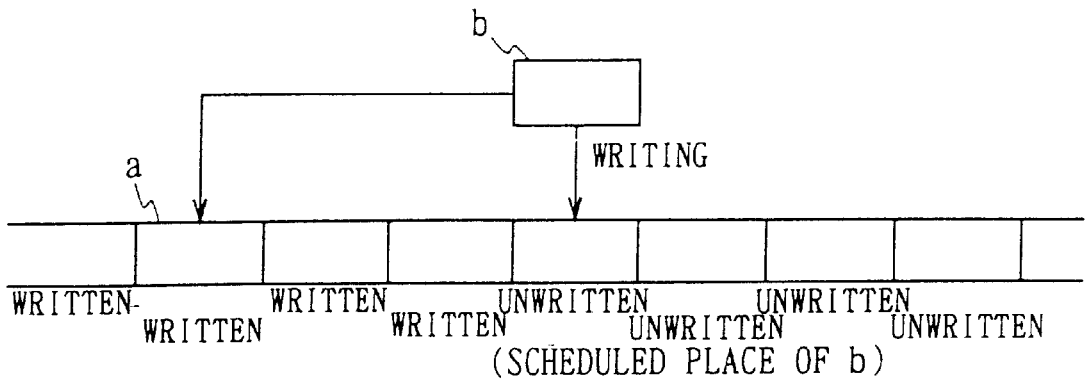
FIGS. 30(A) to 30(C) are a schematic view dedicated for the illustration of a rewriting operation.
Figure 30B:
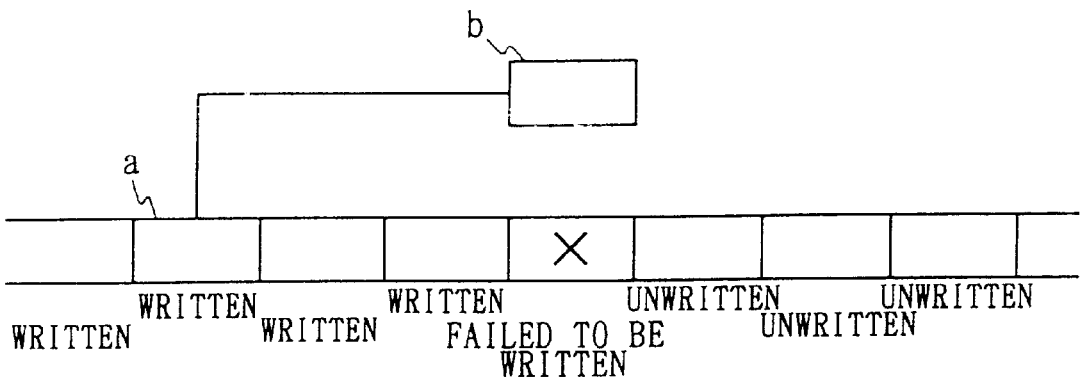
Figure 30C:
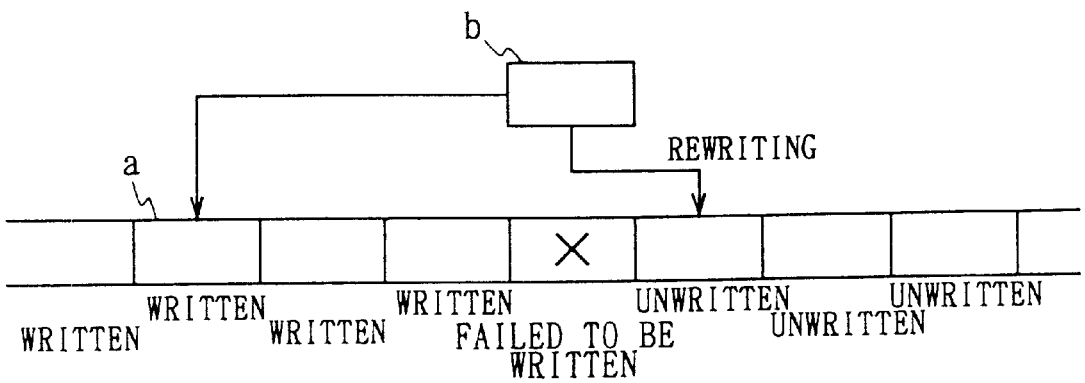

In this manner, a reference relation is established only in a direction from the block which is written on the CD-R disc later toward the block which is written on the CD-R disc earlier. Consequently, as shown in FIG. 30(A), when an attempt is made to write data in the packet unit sequentially from the left (the CD-R disc on the inner circumference) to the right (CD-R disc on the outer circumference), a reference relation is established only in one direction so that the packet data b (for example, the super block) which are about to be written on a new unwritten area refers to the packet data a (for example, node table) which is written on the forward part of the physical address. As a consequence, in the case where the packet data b is failed to be written as shown in FIG. 30(B), only the packet data b which has failed to be written may be rewritten as shown in FIG. 30(C). As a consequence, in the case where it is so constituted that the forward packet data a refers to the backward packet data b, a rewriting operation can be easily performed at the time of error occurrence as compared with the case in which it is necessary to rewrite the physical address information of the backward packet data b in the forward packet data a in accordance with the change in the writing position of the backward packet data b (to write the forward packet data a in a new unwritten area together with the backward packet data b in the case of the CD-R).

Furthermore, in the CDRFS, the flash operation is carried out without fail at the time of taking out the CD-R disc from the CD-R driver 5 so that the super block is written on the last packet. Consequently, when the CD-R disc is inserted into the CD-R drive again, the CDRFS retries the super block from the outermost circumference. On the basis of the control information of the super block described above with respect to FIG. 5, data written on the forward part (inner circumference side) of the super block is referred to. At this time, when the super block is failed to be written on the last packet, the CDRFS searches a super block one block before toward the inner circumference sequentially from the super block. In this case, it becomes difficult to access the user data which is written on the super block after the super block one block before. Consequently, with the CDRFS of the invention, the flash all operation at the time of writing data on the CD-R disc is carried out when a predetermined time has elapsed and an amount of data which exceeds the predetermined amount is written from the cache manager CAM to the CD-R disc. As a result, the super block is written on the CD-R disc relatively frequently with the result that even in the case where the super block which should exist on the last packet fails to be written on the last packet, it becomes possible to avoid the loss of a large amount of user data by reading the super block one block before which is written relatively near to the target super block.

Here, as described with respect to FIG. 11, when the CD-R disc having data written in the CDRFS format is read with the CD-R disc drive, it is necessary to write lead-in information and lead-out information before and after each session. This operation is referred to as freeze. To carry out this freeze operation, a predetermined space capacity is required on the CD-R disc to carry out this freeze operation. When this capacity cannot be secured, it becomes difficult to write the lead-out information. When the CD-R disc is read with the CD-ROM drive, the disc can be read until the session where the previous lead out is recorded with certitude.

Consequently, in the CDRFS, the capacity of the unused area of the CD-R disc is monitored. In other words, the vacant capacity Nfa required for the flash all operation is represented by the following equation in consideration of the bloc for the super bloc;

$$Nfa=\{(Nd+Nn+1+31)/32\}\times(32+7) \tag{10}$$

wherein Nd represents the number of unwritten data blocks in the cache buffer and Nn represents the number of blocks of the node table.

With respect to the freeze, an area for the lead in information is secured at the time when the writing to the session is started, only the capacity of the lead out information may be monitored. The vacant capacity required for the freeze is 1.5×60×75=6750 blocks from the CD-ROM specification when the session is one. The vacant capacity is 30×75 blocks when the session is the second and after. Consequently, the minimum value Ffree of the vacant capacity that should be secured on the CD-R disc is represented by the following equations;

$$Nfree=Nfa+6750 \text{ (1st Session)} \tag{11}$$

$$Nfree=Nfa+2250 \text{ (Nth Session, Nth}\geq 2nd) \tag{12}$$

Incidentally, the error occurrence is not considered in this figure. For example, when it is thought that e times of writing error is generated with respect to the writing of the n packet, the probability of the writing error Pe will be represented by the following equation;

$$Pe = e/n \qquad (13)$$

Here, since one packet is superfluously consumed with respect to one time writing error, a correction of the vacant capacity Nfa in consideration of the writing error is added, the equations (11) and (12) are converted into the following equations;

$$Nfree = Nfa(1+Pe) + 6750 \quad (1st\ Session) \qquad (14)$$

$$Nfree = Nfa(1+Pe) + 2250 \quad (Nth\ Session,\ Nth \geq 2nd) \qquad (15)$$

Thus when a vacant capacity of more than Nfree blocks is secured on the CD-R disc after the preparation and the erasure operation of the sequence blocks, it is possible to carry out the freeze operation.

In the CDRFS, the maximum number of the write cache block number in the cache buffer which is newly generated with one time call with respect to the sequence manager will be MBCmax (Nmax) as described above with respect to the equation (6). In the case where a recording medium such as a CD-R disc or the like having a vacant capacity of Nfree+MBCmax (Nmax) block numbers is inserted into the driver, a warning is given to the user on the lack in the capacity of the recording medium to inhibit the writing of data on the recording medium such as the preparation, the renewal and the erasure of the sequence blocks. With this the CDRFS ensures the freeze operation.

However, the service provided by the CDRFS for accessing to the file is constituted of the multiple frequency operations to the sequence blocks. When writing is inhibited to the recording medium at the time of the termination of the operation to the sequence block, there is a possibility that the integrity as the file system is lost. Consequently, writing inhibition operation to the recording medium (CD-R disc) will be carried out at the end of the request for the operation from the operating system OS to the CDRFS. At this time, when the frequency of the preparation, renewal and the erasure operation of the sequence block which is carried out by the one time operation request to the CDRFS from the operating system OS is represented by Ncb, the condition of the vacant capacity of writing inhibition to the recording medium is less than a value represented by the following equation;

$$Nfree = MBCmax(Nmax) \times Ncb \qquad (16)$$

Figure 31:
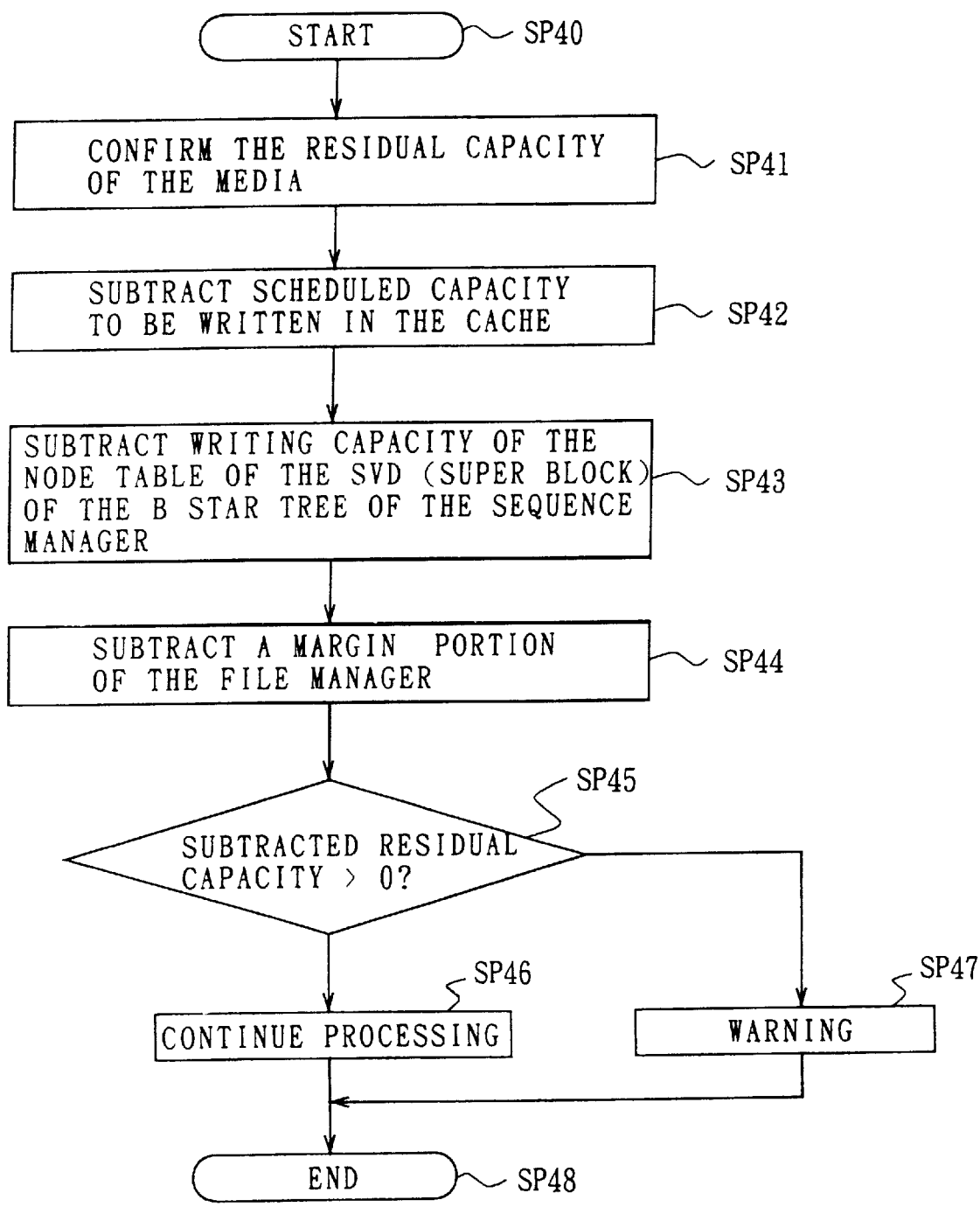
FIG. 31 is a flowchart showing a processing procedure for monitoring a recordable remaining amount of a medium.

In the aforementioned monitoring method, a capacity is secured for writing on the CD-R disc lastly lead-out information for having a compatibility with the CD-R disc. The dirty block portion in addition to the capacity for the lead-out may be monitored together. In other words, such monitoring operation is carried out every time data is written on the CD-R disc in accordance with the procedure of the monitoring processing shown in FIG. 31. In other words, the CDRFS enters into the monitoring processing procedure from step SP40 shown in FIG. 31 to confirm the residual capacity on the CD-R disc at step SP41. In other words, the whole recordable capacity is recorded on the CD-R disc in the process of the CD-R disc manufacture. Consequently, the CD-R driver 5 determines the whole recordable capacity from the target CD-R disc and the recordable residual capacity from the last physical position which is currently recorded. The recordable residual capacity which has been determined is delivered to the cache manager CAM at step SP42. The cache manager CAM subtracts a data amount to be written in the cache buffer from the recordable residual capacity to deliver the residual capacity to the sequence manager SQM. At step SP43, the sequence manager SQM subtracts the super block of the B Star Tree Control Structure (SVD) and the writing amount of the node table from the residual capacity delivered from the cache manager CAM, and delivers the residual capacity to the file manager FLM. At step SP44, the file manager FLM subtracts a margin portion required for recording the lead out information or the like from the residual capacity delivered from the sequence manager SQM.

In the case where the residual capacity calculated in this manner is larger than 0, the CDRFS judges that the data can be written to move to the step SP46 to continue the processing. On the other hand, when a negative answer is obtained at step SP45. This represents that there is no space for writing on the CD-R disc data which is to be processed. At this time, the CDRFS moves to step SP47 to display a predetermined warning to the user. Thus, every time the flash operation and the flash all operation are carried out on the CD-R disc, the residual capacity on the disc after the execution is confirmed. In the case where it is judged that there is no space in the writing amount in the processing after that, it is possible to prevent in advance the continuation of the processing after that with the CD-R disc having no space to write inserted into the CD-R driver 5.

Furthermore, in the CDRFS using the CD-R disc the CD-R disc is pretended to be a rewritable disc. In the case of the CD-R disc, a new area is used is used in every renewal work so that the usable residual capacity of the CD-R disc will decrease. Consequently the usable residual capacity will be monitored every time new data is written. This residual capacity includes the super block and the node table which constitute an element of the B Star Tree control structure and lead out information having a compatibility with the CD-ROM in addition to the dirty block in the cache buffer. It is ensured that the data can be recorded with a compatibility held with the CD-ROM on the CD-R disc with certitude without losing the data during preparation and renewal on the imaginary space by monitoring the residual capacity in which these items of information can be recorded.

In the aforementioned structure, the CDRFS controls the physical address LBA on the CD-R disc in correspondence to the sequence key SQK which constitute a logical address in the imaginary address. Consequently, after the block data on the CD-R disc in which the renewal is designated is read in the cache buffer and the data is renewed, the sequence key SQM is not changed, and only the physical address is changed, the block data is written at the position of the physical address LBA on the CD-R disc at a predetermined timing (at the time of the flash and the flash all operation).

At this time, the file manager FLM uses the logical address on the imaginary address to carry out the renewal, preparation and erasure of the data with the result that even when the media to be used is a write once disc, it is possible to carry out the processing in the same manner as if the target disc is a conventional rewritable disc without recognizing that the disc is the write once disc. In this manner, the processing function of the file manager FLM can be a module which is not affected by the recording medium so that the control of the file and the directory can be carried out without being affected by the special recording processing of the write once disc.

Figure 32:
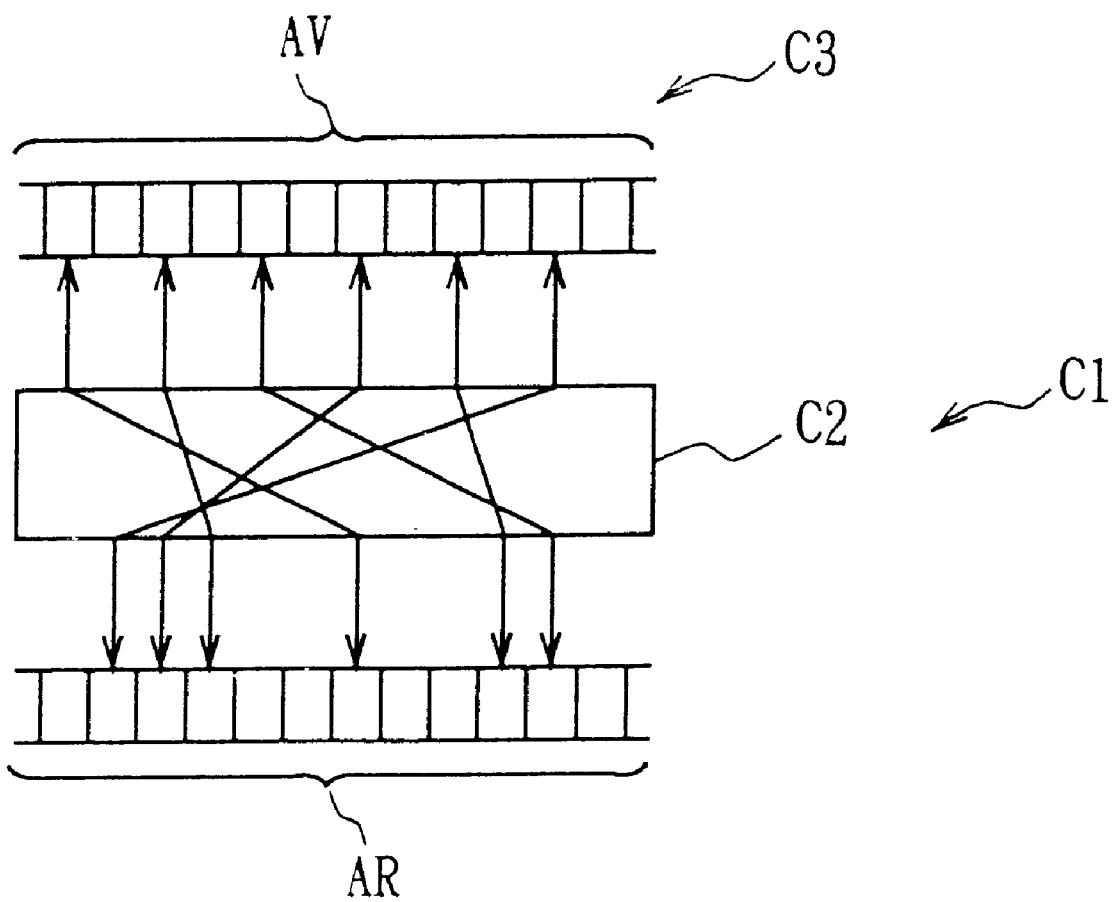
FIG. 32 is a schematic view dedicated for the illustration in the case where the imaginary address space is treated without a correspondence to each file.

Furthermore, as described with respect to FIG. 3, a plurality of imaginary address spaces CV1, CV2 and CD3 are assigned to respective files (sequences) so that one imaginary address space is allowed to correspond to one file. As a consequence, the imaginary address space becomes a file itself so that no work is required for converting the file into the logical address. Incidentally, FIG. 32 shows a case in which the imaginary address AV is converted into a physical address AR on the recording medium by the sequence processing block C 2. In such a method, the imaginary address is not divided for each file so that work is required for converting files into logical addresses as compared with the case of FIG. 3. Consequently, in accordance with the invention, it was possible to construct a file system (CDRFS) corresponding to the write once type without deteriorating an access performance compared with the writable media or the like by assigning an imaginary address space for each data shown in FIG. 3.

With the aforementioned structure, it is possible to treat the CD-R disc which is a write once disc recording medium by allowing the renewed data block newly written on the physical address LBA of the CD-R disc to look like a data block which is present in the address before the renewal by using the CDRFS having an exchange processing function of the address.

Furthermore, it is possible to rewrite the data without affecting other packets even if the writing is failed by limiting the reference relation to one direction so that the packet which is written later refers to the packet which is previously written.

Furthermore, in the case where the packet is generated by collecting the dirty block in the cache buffer, the dirty block is collected in accordance with the priority based on the LRU algorithm so that the scheduled physical address (contact LBA) is assigned by arranging the sequence key SQK so that each sequence key SQK is put in an ascending order with respect to the collected dirty block with the result that when the target dirty block is written on the CD-R disc, the probability will be heightened that the sequence is arranged in the continuous area thereby making it possible to attempt to improve the reading performance.

Furthermore, it is possible to ensure that the data can be recorded on the CD-R disc which is being prepared by the user by monitoring the usable residual capacity of the CD-R disc.

Incidentally, a description is given with respect to the case in which the CD-R disc is used as a write once type recording medium, but the invention is not limited thereto. Other write once type recording medium may be used.

Furthermore, in the aforementioned embodiment, a warning is issued when there is no allowance in the residual capacity at the time of monitoring the usable residual capacity of the CD-R disc. However, the invention is not limited thereto. Data which has been processed may be recorded with certitude on the CD-R disc by carrying out the flash all operation and the freeze operation at the timing of issuing the warning.

Furthermore, in the aforementioned embodiment, a description will be given to a case in which data writing is carried out with respect to one CD-R disc with the CDRFS. The invention is not limited thereto. For example, a plurality of recording media may be set to provide a multiple devices to control a plurality of media with one CDRFS. As a result, for example, a changer for controlling a plurality of media and a juke or the like for controlling a plurality of drives can be easily controlled with one file system.

Industrial Applicability

The present invention provides a system for processing information and recording the information on a recording medium, the system being able to be used in an information processor using a write once disc.

What is claimed is:

1. An information processing apparatus comprising:

control means for allowing a physical position of file data which is recorded on a write-once medium to correspond to a logical position, generating a correspondence table between the logical position and the physical position thereby controlling, upon the physical position being changed, the correspondence relation between the logical position and the physical position after the change;

recording means for recording the file data in a memory and element data of the correspondence table to the write-once medium as written data;

calculating means for calculating a writable residual capacity of the medium based on a whole recordable capacity recorded on the write-once medium and a recordable residual capacity from a last physical position which is currently recorded on the write-once medium;

comparing means for comparing an amount of the written data in the memory with the writable residual capacity of the medium to determine a surplus; and outputting means for outputting a surplus detection result when the surplus is detected,
    wherein the recording means records the written data in the memory on the write-once medium when the surplus detection result is output.

2. The information processing apparatus according to claim 1 wherein the information processing apparatus provides warning means to display a predetermined display means when the surplus detection result is output.

3. The information processing apparatus according to claim 1 wherein the medium is a write once type recording medium, the written data includes format information necessary for a writable recording medium.

4. An information processing apparatus comprising:

control means for allowing a physical position of file data which is recorded on a medium to correspond to a logical position, generating a correspondence table between the logical position and the physical position thereby controlling, upon the physical position being changed, the correspondence relation between the logical position and the physical position after the change;

recording means for recording the file data in a memory and element data of the correspondence table as written data;

calculating means for calculating a writable residual capacity of the medium;

comparing means for comparing an amount of the written data in the memory with the writable residual capacity of the medium to determine a surplus;

outputting means for outputting a surplus detection result when the surplus is detected;

file information table generating means for generating a plurality of file information tables for housing a plurality of corresponding information items showing a correspondence relation between key information showing a logical position of the file data and the physical position of the file data designated by the key information on the medium;

index table generating means for generating an index table showing file information tables respectively housing each of the key information out of the plurality of file information tables; and control table generating means for generating a control table showing a physical recording position on the medium of the index table and the plurality of the file information table the file information, index, and control tables are controlled on the memory as data elements.

5. The information processing apparatus according to claim 4 wherein the key information is a sequence key number and a block number intrinsically attached to the file data.

6. An information processing method comprising the steps of:

allowing a physical position of file data which is recorded on a write-once medium to correspond to a logical position, generating a correspondence table between the logical position and the physical position thereby controlling, upon the physical position being changed, the correspondence relation between the logical position and the physical position after the change;

recording the file data in a memory and element data of the correspondence table to the write-once medium as written data;

calculating a writable residual capacity on the medium based on a whole recordable capacity recorded on the write-once medium and a recordable residual capacity from a last physical position which is currently recorded on the write-once medium;

comparing the writable residual capacity on the medium with the written data amount in the memory; and outputting a surplus detection result when the comparing means shows a surplus of the written amount, wherein the recording means records the written data in the memory on the write-once medium when the surplus detection result is output.

* * * * *